(12) United States Patent
Li et al.

(10) Patent No.: US 10,942,955 B2
(45) Date of Patent: *Mar. 9, 2021

(54) QUESTIONING AND ANSWERING METHOD, METHOD FOR GENERATING QUESTIONING AND ANSWERING SYSTEM, AND METHOD FOR MODIFYING QUESTIONING AND ANSWERING SYSTEM

(71) Applicant: Shanghai Xiaoi Robot Technology Co., Ltd., Shanghai (CN)

(72) Inventors: Bo Li, Shanghai (CN); Zhongqiu Jiang, Shanghai (CN); Yongmei Zeng, Shanghai (CN); Pinpin Zhu, Shanghai (CN)

(73) Assignee: SHANGHAI XIAOI ROBOT TECHNOLOGY CO., LTD., Shanghai (CN)

( * ) Notice: Subject to any disclaimer, the term of this patent is extended or adjusted under 35 U.S.C. 154(b) by 255 days.

This patent is subject to a terminal disclaimer.

(21) Appl. No.: 16/103,104

(22) Filed: Aug. 14, 2018

(65) Prior Publication Data
US 2019/0197181 A1 Jun. 27, 2019

(30) Foreign Application Priority Data

Dec. 21, 2017 (CN) .......................... 201711393847.0
Dec. 21, 2017 (CN) .......................... 201711393848.5
(Continued)

(51) Int. Cl.
*G06F 16/00* (2019.01)
*G06F 16/332* (2019.01)
(Continued)

(52) U.S. Cl.
CPC .......... *G06F 16/3329* (2019.01); *G06F 9/466* (2013.01); *G06N 5/02* (2013.01)

(58) Field of Classification Search
CPC combination set(s) only.
See application file for complete search history.

(56) References Cited

U.S. PATENT DOCUMENTS 8,171,032 B2 * 5/2012 Herz ...................... G06Q 30/02
707/748
8,417,258 B2 * 4/2013 Barnes, Jr. ............. G06Q 30/06
455/456.1
(Continued)

*Primary Examiner* — Jean M Corrielus
(74) *Attorney, Agent, or Firm* — Flener; Zareefa B. Flener

(57) ABSTRACT

According to a specific implementation manner that a questioning and answering system including a transaction node interacts with a user in the embodiments of the present invention, a quick call to an existing function or service can be realized, and by acquiring modification information for a set system component in the questioning and answering system, and correspondingly updating the questioning and answering system according to the modification information, the existing questioning and answering method based on a questioning and answering system, the existing method for generating the questioning and answering system, and the existing method for modifying the questioning and answering system are optimized, thereby improving efficiency and accuracy of questioning and answering, and improving generation efficiency and modification efficiency of the questioning and answering system.

20 Claims, 11 Drawing Sheets

(30) Foreign Application Priority Data

| Dec. 21, 2017 | (CN) | .......................... | 201711393856.X |
| Dec. 21, 2017 | (CN) | .......................... | 201711395176.1 |
| Dec. 21, 2017 | (CN) | .......................... | 201711396315.2 |
| Dec. 21, 2017 | (CN) | .......................... | 201711396322.2 |

(51) Int. Cl.
*G06F 9/46* (2006.01)
*G06N 5/02* (2006.01)

(56) References Cited

U.S. PATENT DOCUMENTS

| 8,856,075 | B2* | 10/2014 | Rathod | ................. | G06Q 10/00 |
| | | | | | 707/627 |
| 10,187,337 | B2* | 1/2019 | Smullen | ................. | H04L 63/18 |
| 2009/0234878 | A1* | 9/2009 | Herz | ................. | H04N 21/4532 |
| 2014/0214622 | A1* | 7/2014 | Kaneko | ............. | G06Q 30/0623 |
| | | | | | 705/26.62 |
| 2015/0310112 | A1* | 10/2015 | Allen | ...................... | G06F 40/30 |
| | | | | | 706/58 |
| 2016/0162456 | A1* | 6/2016 | Munro | ................. | G06F 40/137 |
| | | | | | 704/9 |
| 2019/0188585 | A1* | 6/2019 | Li | .......................... | G06N 5/003 |

\* cited by examiner

QUESTIONING AND ANSWERING METHOD, METHOD FOR GENERATING QUESTIONING AND ANSWERING SYSTEM, AND METHOD FOR MODIFYING QUESTIONING AND ANSWERING SYSTEM

CROSS-REFERENCE TO RELATED APPLICATIONS

This application claims priority to CN Patent Application No. 2017/11393848.5, filed on Dec. 21, 2017, CN Patent Application No. 2017/11396315.2, filed on Dec. 21, 2017, CN Patent Application No. 2017/11393847.0, filed on Dec. 21, 2017, CN Patent Application No. 2017/11393856.X, filed on Dec. 21, 2017, CN Patent Application No. 2017/11395176.1, filed on Dec. 21, 2017 and CN Patent Application No. 2017/11396322.2, filed on Dec. 21, 2017. All of the aforementioned applications are hereby incorporated by reference in their entireties.

TECHNICAL FIELD

Embodiments of the present invention relate to intelligent questioning and answering systems, and in particular to a questioning and answering method, a method for generating a questioning and answering system and a method for modifying a questioning and answering system.

BACKGROUND

The human-machine interaction is a science that studies an interactive relationship between systems and users. The systems may be a variety of machines, or may be computerized systems and software. For example, various artificial intelligence (AI) systems (intelligent customer-service systems, voice control systems, etc.) may be implemented through human-machine interaction. Artificial intelligence semantic recognition is the basis of the human-machine interaction. By the AI semantic recognition, a human language can be recognized and converted into a machine-understandable language.

Intelligent question answering systems are one typical application of the human-machine interaction. When a user raises a question, the intelligent question answering system provides an answer to this question. In the prior art, a process designer may design different questioning and answering flowcharts according to different questioning and answering requirements, and a developer implements the above questioning and answering flowcharts in a form of code to finally acquire a corresponding intelligent questioning and answering system.

As the technology continuously advances, requirements of people to the questioning and answering system and questioning and answering for the system are constantly improving, and existing questioning and answering technology has been unable to meet increasing questioning and answering requirement of the people on personalization and convenience.

Moreover, a defect of the prior art mainly lies in that a certain degree of process overlap may occur in different questioning and answering flowcharts designed by the process designer. For example, a questioning and answering flowchart associated with a schedule may involve a process of meeting room reservation, and the process of meeting room reservation may appear in another flowchart of meeting room reservation. In such case, the developer may need to repeatedly write process code that implements the same function or transplant one already programmed process code to another process code, which has a large workload and high error rate. In addition, the case is that the process designer of the intelligent questioning and answering system asks for requirements, and then the developer writes corresponding code. In other words, the code that implements a process is completely a black box for the process designer of the intelligent questioning and answering system. If it needs to make any changes to the questioning and answering system, even if it only needs to modify an answer speech, the developer has to be introduced to modify the process code, regenerate a corresponding process service and then update the process service to a server. In addition, if the process service does not follow an established process during an interaction process, the developer also needs to involve setting a breakpoint to find a problem in the code.

In addition to the above, requirements of people to the questioning and answering system and modification of the system are constantly improving, and existing modification technology of the questioning and answering technology has been unable to meet increasing modification requirement of the people on personalization and convenience.

SUMMARY

In view of this, embodiments of the present invention provide a questioning and answering method, a method for generating a questioning and answering system, so as to optimize an existing questioning and answering method based on a questioning and answering system, an existing method for generating the questioning and answering system, and an existing method for modifying the questioning and answering system, thereby improving efficiency and accuracy of questioning and answering, and improving generation efficiency and modification efficiency of the questioning and answering system.

As a first aspect of the present invention, an embodiment of the present invention provides a questioning and answering method, so as to optimize an existing questioning and answering method based on a questioning and answering system, thereby improving efficiency and accuracy of questioning and answering.

An embodiment of the present invention provides a questioning and answering method applied to a questioning and answering system, including:

acquiring initial request information input by a user, and matching a knowledge point in a knowledge base with the initial request information, where a plurality of knowledge points are stored in the knowledge base, and each of the knowledge points includes a question and an answer;

if it is determined that the initial request information input by the user is matched with a thematic question of a target thematic knowledge point, triggering a root node of a target questioning and answering flow module corresponding to the target thematic knowledge point according to a thematic answer in the target thematic knowledge point, where the target questioning and answering flow module includes at least one transaction node; and when the target transaction node in the questioning and answering flow module is triggered, constructing, by the target transaction node, target transaction information according to at least one target dynamic variable input to the target transaction node, sending, by the target transaction node, the target transaction information to a corresponding target service invocation address, and returning a target transaction processing result fed back by the target service invocation address to the target questioning and answering flow module, so that the target questioning and answering flow module performs further execution according to the target transaction processing result.

An embodiment of the present invention further provides a questioning and answering device based on a questioning and answering system, which is applied to the questioning and answering system, including:

an initial request information acquisition module, configured to acquire initial request information input by a user, and match a knowledge point in a knowledge base with the initial request information, where a plurality of knowledge points are stored in the knowledge base, and each of the knowledge points includes a question and an answer;

a target questioning and answering flow module trigger module, configured to, if it is determined that the initial request information input by the user is matched with a thematic question of a target thematic knowledge point, trigger a root node of a target questioning and answering flow module corresponding to the target thematic knowledge point according to a thematic answer in the target thematic knowledge point, where the target questioning and answering flow module includes at least one transaction node; and a target transaction node trigger and execution module, including:

a successful trigger determination unit, configured to determine that a target transaction node in the questioning and answering flow module is successfully triggered;

a transaction information sending unit, configured to, when the target transaction node in the questioning and answering flow module is successfully triggered, construct, by the target transaction node, target transaction information according to at least one target dynamic variable input to the target transaction node, and send, by the target transaction node, the target transaction information to a corresponding target service invocation address; and a transaction processing result return unit, configured to return, by the target transaction node, a target transaction processing result fed back by the target service invocation address to the target questioning and answering flow module, so that the target questioning and answering flow module performs further execution according to the target transaction processing result.

An embodiment of the present invention further provides a terminal apparatus, where the terminal apparatus includes:

one or more processors; and a storage device for storing one or more programs, when the one or more programs are executed by the one or more processors, such that the one or more processors implement the questioning and answering method based on the questioning and answering system according to any one of embodiments of the present invention.

An embodiment of the present invention further provides a computer storage medium on which a computer program is stored, and when executed by the processor, the program implements the questioning and answering method based on the questioning and answering system according to any one of embodiments of the present invention.

The embodiments of the present invention provide a questioning and answering method, a questioning and answering device based on a questioning and answering system, a terminal apparatus and a storage medium. Based on a technical measure of acquiring initial request information input by a user, and matching a knowledge point in a knowledge base with the initial request information; if it is determined that the initial request information input by the user is matched with a thematic question of a target thematic knowledge point, triggering a root node of a target questioning and answering flow module corresponding to the target thematic knowledge point according to a thematic answer in the target thematic knowledge point; and when the target transaction node in the questioning and answering flow module is triggered, constructing, by the target transaction node, target transaction information according to at least one target dynamic variable input to the target transaction node, sending, by the target transaction node, the target transaction information to a corresponding target service invocation address, and returning a target transaction processing result fed back by the target service invocation address to the target questioning and answering flow module, a specific implementation manner that a questioning and answering system including a transaction node interacts with a user is provided, which greatly satisfies user's questioning and answering requirements and improves efficiency and accuracy of the questioning and answering.

As a second aspect of the present invention, an embodiment of the present invention provides a method for generating a questioning and answering system, a terminal apparatus, a storage medium and the questioning and answering system, so as to optimize an implementation manner of an existing questioning and answering system, thereby improving generation efficiency of the questioning and answering system.

An embodiment of the present invention provides a method for generating a questioning and answering system, including:

acquiring one or more graphical questioning and answering flowcharts;

generating a standardized code framework matched with the questioning and answering flowchart according to each of graphic components included in each of the questioning and answering flowcharts, where the graphic component includes at least one transaction node, and the transaction node is associated with a service interface executing a set type service; and according to custom configuration information matched with each of the graphic components in the questioning and answering flowchart, generating custom codes corresponding to each of the graphic components respectively and adding the custom codes at a position associated with the graphic component in the standardized code framework, to generate a questioning and answering flow module corresponding to the questioning and answering flowchart, where the custom configuration information matched with the transaction node includes a service invocation address corresponding to the transaction node, and the service invocation address points to a service interface associated with the transaction node;

when the target transaction node in the questioning and answering flow module is triggered, constructing, by the target transaction node, target transaction information according to at least one target dynamic variable input to the target transaction node, sending, by the target transaction node, the target transaction information to a corresponding target service invocation address, and returning a transaction processing result fed back by the service invocation address to the questioning and answering flow module, so that the questioning and answering flow module performs further execution according to the transaction processing result; and adding a thematic knowledge point corresponding to each of the questioning and answering flow modules in the knowledge base, where the thematic knowledge point includes a thematic question and a thematic answer, the thematic question is used to indicate a trigger condition of the questioning and answering flow module, and the thematic answer is used to establish a trigger relationship between the thematic knowledge point and the questioning and answering flow module.

An embodiment of the present invention further provides a questioning and answering system, and the questioning and answering system is generated by a method for generating the questioning and answering system according to any one of embodiments of the invention.

An embodiment of the present invention further provides a generation device of a questioning and answering system, including:

a questioning and answering flowchart acquisition module, configured to acquire one or more graphical questioning and answering flowcharts;

a standardized code framework generation module, configured to generate a standardized code framework matched with the questioning and answering flowchart according to each of the graphic components included in the questioning and answering flowchart, where the graphic components include:

at least one transaction node, and the transaction node is associated with a service interface executing a set type service;

a custom code addition module, configured to, according to custom configuration information matched with each of the graphic components in the questioning and answering flowchart, generate custom codes corresponding to each of the graphic components respectively and add the custom codes at a position associated with the graphic component in the standardized code framework, to generate a questioning and answering flow module corresponding to the questioning and answering flowchart, where the custom configuration information matched with the transaction node includes a service invocation address corresponding to the transaction node, and the service invocation address points to a service interface associated with the transaction node;

when the target transaction node in the questioning and answering flow module is triggered, the target transaction node constructs target transaction information according to at least one target dynamic variable input to the target transaction node, sends the target transaction information to a corresponding target service invocation address, and returns a transaction processing result fed back by the service invocation address to the questioning and answering flow module, so that the questioning and answering flow module performs further execution according to the transaction processing result; and a thematic knowledge point addition module, configured to add a thematic knowledge point corresponding to each of the questioning and answering flow modules in the knowledge base, where the thematic knowledge point includes a thematic question and a thematic answer, the thematic question is used to indicate a trigger condition of the questioning and answering flow module, and the thematic answer is used to establish a trigger relationship between the thematic knowledge point and the questioning and answering flow module.

An embodiment of the present invention further provides a terminal apparatus, where the terminal apparatus includes one or more processors; and a storage device for storing one or more programs, when the one or more programs are executed by the one or more processors, such that the one or more processors implement a method for generating a questioning and answering system according to any one of embodiments of the present invention.

An embodiment of the present invention further provides a computer storage medium on which a computer program is stored, and when executed by the processor, the program implements a method for generating the questioning and answering system according to any one of embodiments of the present invention.

The embodiments of the present invention provide a method for generating a questioning and answering system, a generation device of the questioning and answering system, a terminal apparatus, a storage medium and the questioning and answering system. Based on a graphical questioning and answering flowchart and custom configuration information set for each of the graphic components in the questioning and answering flowchart, a questioning and answering flow module for implementing a function of the questioning and answering flowchart may be automatically generated, and then by a manner of adding a thematic knowledge point corresponding to each of the questioning and answering flow modules in the knowledge base, use of a questioning and answering system generated based on the questioning and answering flow module may be flexibly implemented, so that a method for generating the questioning and answering system realized by a WYSIWYG manner is provided, optimizing an implementation manner of existing questioning and answering system. In addition, by introducing a transaction node in the graphic component, a quick call to an existing function or service may be realized, and a business attribute required in a business process may be acquired, thereby avoiding repeated writing or transplanting of the code that implements the same function, ensuring simplicity that the questioning and answering system implements the code, reducing workload and error probability of developers, realizing rapid construction and update of the questioning and answering system, and avoiding introduction of the developers in process of generating the questioning and answering system, thereby greatly reducing the workload of the developers, reducing a cost, and increasing accuracy and efficiency.

As a third aspect of the present invention, an embodiment of the present invention further provides a method for modifying a questioning and answering system, so as to optimize existing technology of modifying a questioning and answering system, thereby improving modification efficiency and convenience of the questioning and answering system.

An embodiment of the present invention provides a method for modifying a questioning and answering system, including:

acquiring modification information for a set system component in the questioning and answering system, where the modification information includes any one or any combination of: modifying a thematic knowledge point corresponding to the questioning and answering system, and modifying a target questioning and answering flow module corresponding to the questioning and answering system; and correspondingly updating the questioning and answering system according to the modification information.

An embodiment of the present invention provides a device for modifying a questioning and answering system, including:

acquiring modification information for a set system component in the questioning and answering system, where the modification information includes any one or any combination of: modifying a thematic knowledge point corresponding to the questioning and answering system, and modifying a target questioning and answering flow module corresponding to the questioning and answering system; and correspondingly updating the questioning and answering system according to the modification information.

An embodiment of the present invention further provides a terminal apparatus, where the terminal apparatus includes:

one or more processors; and a storage device for storing one or more programs, when the one or more programs are executed by the one or more processors, such that the one or more processors implement a method for modifying the questioning and answering system according to any one of embodiments of the present invention.

An embodiment of the present invention further provides a computer storage medium on which a computer program is stored, and when executed by the processor, the program implements a method for modifying the questioning and answering system according to any one of embodiments of the present invention.

The embodiments of the present invention provide a method for modifying a questioning and answering system, a device for modifying the questioning and answering system, a terminal apparatus, and a storage medium. Based on a technical measure of acquiring modification information for a set system component in the questioning and answering system, where the modification information includes any one or any combination of: modifying a thematic knowledge point corresponding to the questioning and answering system, and modifying a target questioning and answering flow module corresponding to the questioning and answering system; and correspondingly updating the questioning and answering system according to the modification information, a specific manner for modifying the questioning and answering system is provided, which greatly satisfies the user's requirements to modify the questioning and answering system, optimizes existing method of modifying the questioning and answering system, improves efficiency and convenience of modifying the questioning and answering, implementing rapid modification and update of the questioning and answering system, avoids introduction of the developer in process of modifying the questioning and answering system, thereby greatly reducing workload of developers.

DETAILED DESCRIPTION

Figure 1A:
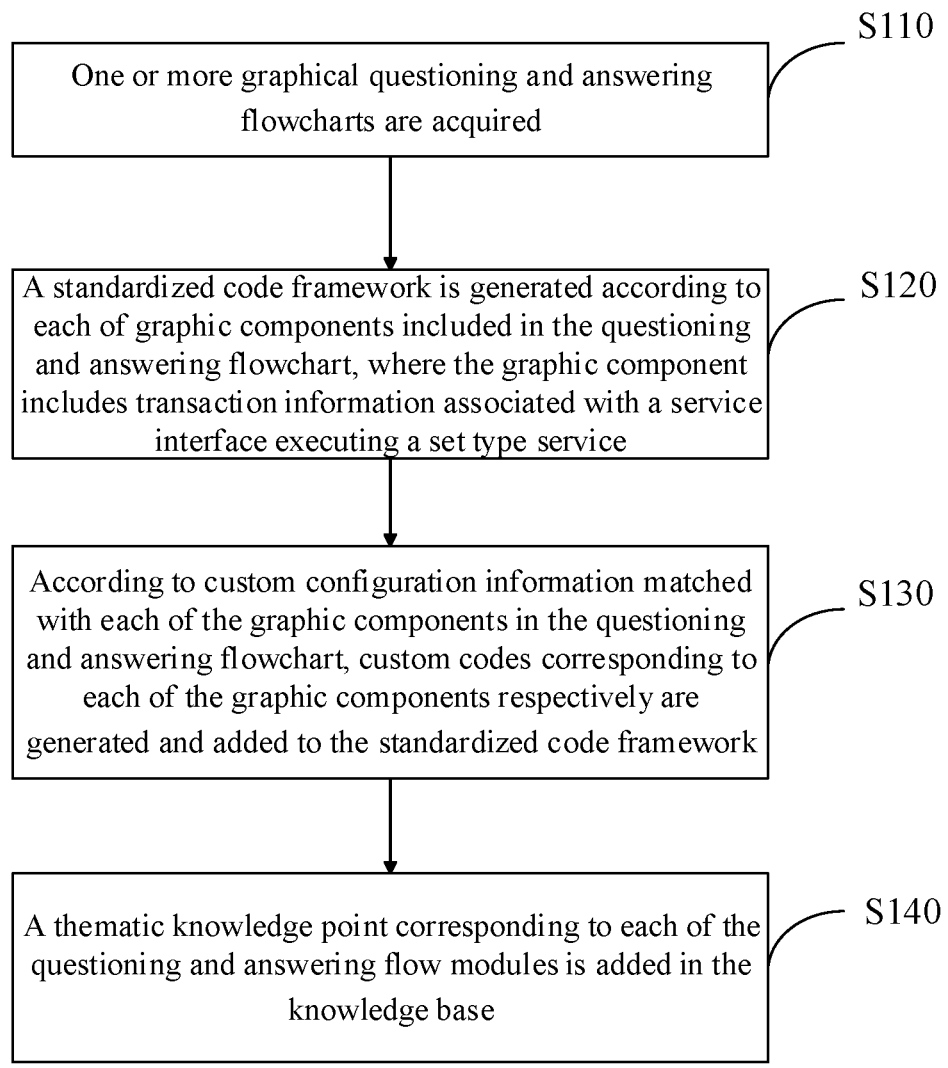
FIG. 1a is a flowchart of a method for generating a questioning and answering system applicable to an embodiment of the present invention.

The present invention will be further described below in detail in combination with accompanying drawings and embodiments. It may be understood that, a specific embodiment described herein are merely used for illustrating the present invention, rather than limiting the present invention. In addition, it should be note that, for convenience of illustration, for ease of description, only some but not all of the structures related to the present invention are shown in the accompanying drawings.

In addition, it also should be note that, for ease of description, only some but not all of the contents related to the present invention are shown in the accompanying drawings. Before exemplary embodiments are discussed in more detail, it should be noted that some exemplary embodiments are described as processes or methods in form of flowcharts. Although various operations (or steps) are described as being performed sequentially in the flowcharts, many operations can be implemented in parallel, concurrently or simultaneously. In addition, the order of the operations can be rearranged. The process may be terminated when its operations have been completed; however, it is also possible that there are additional steps not shown in the accompanying drawings. The processing may correspond to a method, a function, a procedure, a subroutine, a subprogram, or the like.

To easily understand the content of the embodiments of the present invention, the related concepts of the question answering knowledge points and the semantic expressions in the questioning and answering will be briefly described below.

1. Questioning and Answering Knowledge Points

The most original and simplest form of questioning and answering knowledge points in a knowledge base is the commonly used FAQ, and the general form is "question-answer" pairs. For example, "the charge for the ring-back tone" is a clearly expressed standard question description. The "question" herein should not be narrowly interpreted as an "inquiry", and instead, it should be broadly interpreted as an "input" which has a corresponding "output". For example, for the semantic recognition in a control system, a user's instruction, for example, "Turn on the radio", should also be interpreted as a "question". In this case, the corresponding "answer" can be invocation of a control program for executing the corresponding control.

When a user inputs a standard question to a machine ideally, an intelligent semantic recognition system of the machine can immediately understand the user's intention. However, users often input some variants of a standard question, instead of the standard question. For example, if the standard question for the switchover between broadcasting stations of the radio is "change a broadcasting station", a user's command may be "switch a broadcasting station", then the machine is expected to recognize that the two expressions have the same meaning.

For the intelligent semantic recognition, extended questions of a standard question need to be contained in the knowledge base. The extended questions are slightly different from the standard question in expression form, but have the same meaning as the standard question.

Therefore, the knowledge base includes multiple questioning and answering knowledge points. Each questioning and answering knowledge point includes a question and an answer. The questions include a standard question and multiple extended questions. The questions in the questioning and answering knowledge points are generally presented in form of semantic expressions.

2. Semantic Expression

A semantic expression is mainly composed of words, a word class and the "or" relationship thereof, mainly depending upon the "word class". A simple understanding of the word class is that a group of words having something in common. These words may be similar or dissimilar in semantics, or may be marked as important or unimportant. A relationship between the semantic expression and the user's question is quite different from the conventional template matching. In the conventional template matching, there is only a matched or unmatched relationship between a template and the user's question. However, the relationship between the semantic expression and the user's question is expressed by a quantized value (similarity), and the quantified value can be compared with the similarity between a similar question and the user's question. Since the semantic expression will be involved in the calculation of the similarity with the similar question, the template syntax should not be defined complicatedly, but must be competent to express the semantics.

In addition, in various embodiments of the present invention, a questioning and answering method for a set questioning and answering system and a device thereof, a method and a device for generating the questioning and answering system, and a method and a device for modifying the questioning and answering system are provided, where the questioning and answering system specifically includes:

a questioning and answering flow module corresponding to a questioning and answering flowchart, where the questioning and answering flowchart includes a plurality of graphic components, and the graphic components include at least one transaction node, where the transaction node is associated with a service interface executing a set type service; and a thematic knowledge point stored in the knowledge base, where the thematic knowledge point includes a thematic question and a thematic answer, the thematic question is used to indicate a trigger condition of the questioning and answering flow module matched with the questioning and answering system, and the thematic answer is used to establish a trigger relationship between the thematic knowledge point and the questioning and answering flow module.

Further, the questioning and answering system also includes:

a knowledge point corresponding to a set transaction node in the questioning and answering flow module and stored in the knowledge base, the knowledge point corresponding to the transaction node includes a transaction question and a transaction answer, and the transaction answer includes an associated transaction node, a type of at least one incoming parameter, a type of at least one missing parameter, and counter-question content matched with the type of the missing parameter;

the transaction question is used to match received user input information;

the type of the incoming parameter is used to match a type of a dynamic variable included in the user input information; the type of the missing parameter and the counter-question content matched with the type of the missing parameter are used to determine counter-question content corresponding to the type of the missing parameter in the user input information; and the associated transaction node is used to determine a transaction node to which the dynamic variable contained in the user input information is input.

Further, the questioning and answering flow module corresponding to the questioning and answering flowchart specifically includes:

a standardized code framework matched with the questioning and answering flowchart and generated according to each of the graphic components included in the questioning and answering flowchart; and a custom code added at a position associated with a graphic component in the standardized code framework and corresponding to each of the graphic components respectively, and generated according to custom configuration information matched with each of the graphic components in the questioning and answering flowchart, where the custom configuration information matched with the transaction node includes a service invocation address corresponding to the transaction node, and the service invocation address points to a service interface associated with the transaction node.

FIG. 1a is a flowchart of a method for generating the above questioning and answering system. This embodiment may be applicable to a case where a questioning and answering system is generated according to a questioning and answering flowchart, where the questioning and answering system specifically refers to a system that may perform a questioning and answering interaction with an interactive user, and the method may be performed by a questioning and answering device, which may be implemented in software and/or hardware, and may generally be integrated in a terminal apparatus or a server for generating the questioning and answering system. As shown in FIG. 1a, the method of this embodiment specifically includes:

S110. One or more graphical questioning and answering flowcharts are acquired.

The questioning and answering flowcharts may specifically be graphical flowcharts acquired by selecting and combining various graphic components provided in a set process editing interface.

The graphic components may include nodes and connectors (typically, connecting lines) for connecting different nodes. The nodes include one or more transaction nodes.

The transaction node is associated with a service interface executing a set type service and configured to construct transaction information according to a dynamic variable input to the transaction node, send the transaction information to the associated service interface, and receive a transaction processing result fed back by the service interface.

The service interface is configured to acquire a corresponding transaction processing result through its own processing logic according to input transaction information. For example, a service interface for reserving a meeting room can complete a meeting room reservation operation according to the input meeting room reservation parameters (e.g., the time XX and XX meeting room) as the transaction information by its own processing logic, and then return a result of meeting room reservation, for example, successful reservation or failed reservation, as the transaction processing result; or, a service interface for inquiring a meeting room can complete an operation of inquiring available meeting rooms according to the input meeting room inquiry parameters (e.g., the time XX, the number XX of participants, and meeting rooms with or without a projector) as the transaction information by its own processing logic, and return the information about meeting rooms satisfying the inquiry condition as the transaction processing result.

Based on the above analysis, it can be seen that if one or more service functions that have already been implemented (e.g., meeting room reservation, online train ticket or plane ticket reservation, hospital registration, etc.) are to be used in a questioning and answering system, a service interface matched with the service function may be invoked by introducing a transaction node, and it is unnecessary to write or transplant a program code corresponding to the required service function in the questioning and answering system. Therefore, under the premise of greatly simplifying program codes, the workload required to implement the questioning and answering system is reduced.

In addition, it should be noted that a service interface that can be invoked by a transaction node may also be implemented based on a process code automatically generated by a service flowchart including multiple nodes. The above service flowchart differs from the questioning and answering flowchart in the embodiment of the present invention mainly in that, for the questioning and answering flowchart in the embodiment of the present invention, different proceeding trends of a node in the questioning and answering flowchart are controlled according to content input by the user and questioning and answering interaction with the user during the process execution, while for a service flowchart, simply by receiving one or more pieces of transaction information at the beginning of the proceed, the service flowchart is executed in an given execution order, and the user is not required to input any content.

From an overall structure of a questioning and answering flowchart, one questioning and answering flowchart may include one root node representing the beginning of the process and one or more termination nodes representing the end of the process. Of course, it may be understood that, besides including one or more transaction nodes, the nodes may further include one or more following types of nodes: broadcast nodes, variable set nodes and recording nodes, and this embodiment is not limited hereto. Generally speaking, the root node in a questioning and answering flowchart is a transaction node or an interaction node, and the termination node is a broadcast node.

Figure 1B:
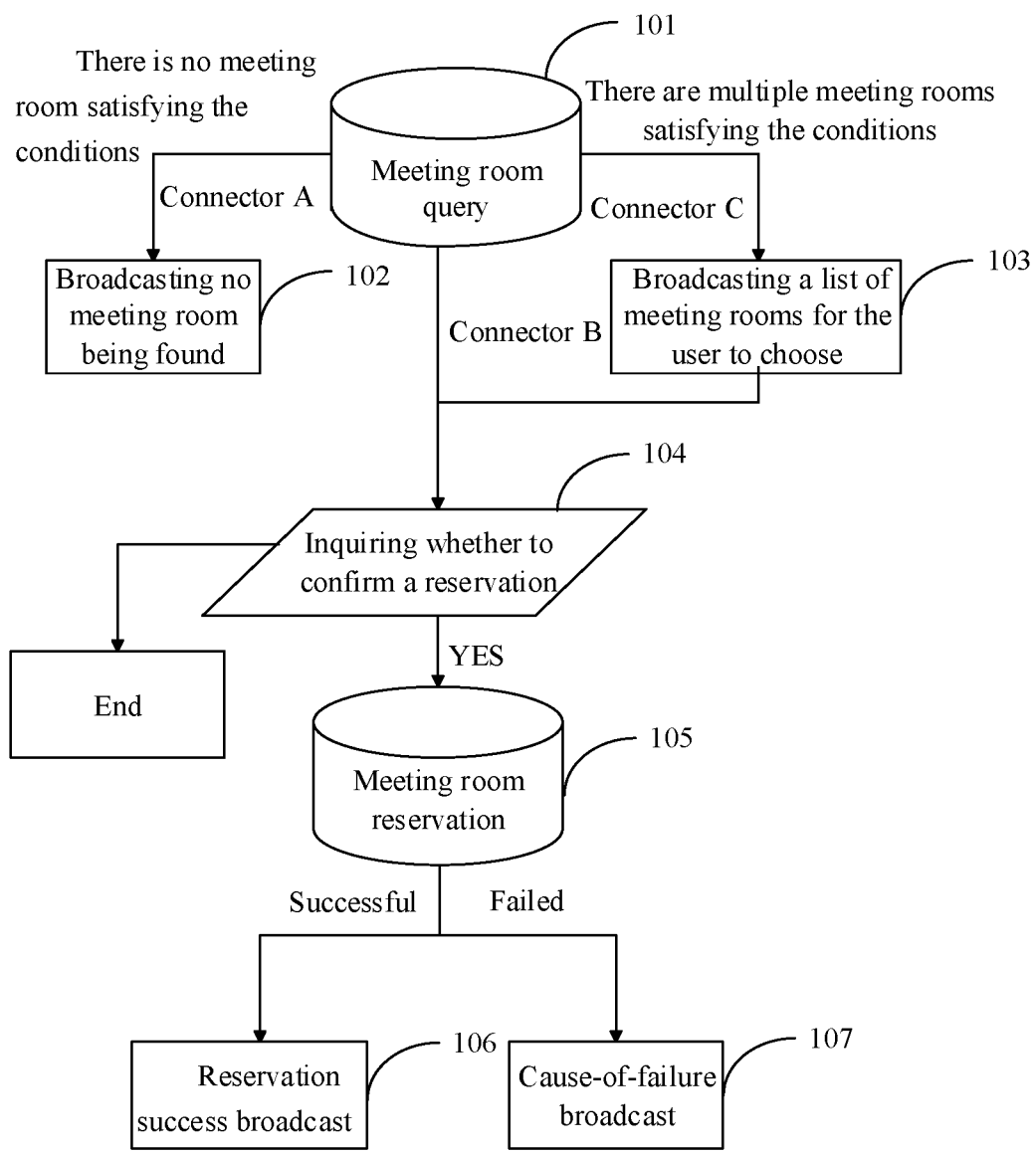
FIG. 1b is a schematic diagram of a graphical questioning and answering flowchart applicable to an embodiment of the present invention.

For ease of understanding, FIG. 1b shows a graphical questioning and answering flowchart. As shown in FIG. 1b, the oval graphic components in the questioning and answering flowchart are transaction nodes (for example, a meeting room inquiry node 101 and a meeting room reservation node 105), the square graphic components are broadcast nodes (for example, a reservation success broadcast node 106), and the diamond graphic component is an interaction node (for example, a node 104 for inquiring whether to confirm a reservation). The nodes are connected by node-to-node connection lines (for example, connection line A and connection line B). Related concepts about interaction nodes and broadcast nodes will be introduced below.

S120. A standardized code framework matched with the questioning and answering flowchart is generated according to each of graphic components included in each of the questioning and answering flowcharts, where the graphic component includes at least one transaction node, and the transaction node is associated with a service interface executing a set type service.

A questioning and answering flow module that may be automatically generated is provided. Correspondingly, standard implementation codes matched with different types of graphic components are provided in advance, for example, the standard implementation codes corresponding to a transaction node, a broadcast node, and a broadcast node are respectively constructed and encapsulated in different library files, and a correspondence between the standard implementation codes and corresponding graphic components is established in advance. Typically, a storage address (or a reference address) of a standard implementation code matched with each graphic component may be written in the process editing interface, and correspondingly, the standardized code framework may be automatically generated for each of the graphic components included in the questioning and answering flowchart drawn based on the process editing interface.

It should be noted that the embodiment of the present invention mainly focuses on a questioning and answering method including a transaction node. Therefore, the questioning and answering flowchart includes one or more transaction nodes. However, the above technical solution may theoretically implement any type of questioning and answering. As long as a corresponding flowchart is drawn according to needs, a corresponding standardized code framework may be acquired, and a corresponding flow module may be acquired.

S130. According to custom configuration information matched with each of the graphic components in the questioning and answering flowchart, custom codes corresponding to each of the graphic components respectively are generated and added at a position associated with the graphic component in the standardized code framework, to generate a questioning and answering flow module corresponding to the questioning and answering flowchart.

It should be understood that the standard implementation code matched with each of the graphic components only includes common functions that can be implemented by the corresponding graphic components. For example, for a transaction node, a corresponding standard time code includes logic for parameter passing. For an interaction node, a corresponding standard implementation code includes determining logic, or for a broadcast node, a corresponding standard implementation code includes broadcast logic and the like. In order to enable a graphic component to implement different functions assigned in different questioning and answering flowcharts, corresponding custom configuration parameters are required to be input.

In a simple example, for node 102 for broadcasting no meeting room being found in FIG. 1b, content of "no meeting room being found" should be broadcasted after the node 102 for broadcasting no meeting room being found is triggered. Correspondingly, the above broadcast content of "no meeting room being found" is a function assigned to the node 102 for broadcasting no meeting room being found. In order to enable the node 102 for broadcasting no meeting room being found to implement the above function, the above broadcast content needs to be added to a code position corresponding to the node 102 for broadcasting no meeting room being found in the standardized code framework as custom configuration information.

Typically, it is possible to reserve a blank code segment at a set position in the standard implementation code matched with each graphic component. When a custom configuration parameter input for a graphic component in the questioning and answering flowchart is acquired (for example, input through a parameter configuration interface provided by the proceed edition interface), a custom code matched with the custom configuration parameter is added in the corresponding blank code segment to realize the custom function of the graphic component.

Optionally, the custom configuration information (for example, no meeting room being found) may be directly added to the standardized code framework as the custom code, or according to set content selected by a user from a custom configuration information input template (for example, an interface transfer mode selected for a transaction node), a prewritten custom code matched with different custom configuration information may be added to the standardized code framework. This will not be limited in this embodiment.

Correspondingly, if custom setting for all graphic components included in a questioning and answering flowchart is completed, an implementation code capable of implementing the function of the questioning and answering flowchart may be generated, that is, the questioning and answering flow module described in the embodiment of the present invention is generated.

Since the transaction node is associated with a service interface executing a set type service, the custom configuration information matched with the transaction node includes a service invocation address corresponding to the transaction node, and the service invocation address points to a service interface associated with the transaction node.

When the target transaction node in the questioning and answering flow module is triggered, the target transaction node constructs target transaction information according to at least one target dynamic variable input to the target transaction node, sends the target transaction information to a corresponding target service invocation address, and returns a transaction processing result fed back by the service invocation address to the questioning and answering flow module, so that the questioning and answering flow module performs further execution according to the transaction processing result.

It should be noted that, when a transaction node is triggered, one or more dynamic variables acquired by and input to the transaction node may be extracted from user interaction information (for example, a meeting room inquiry node 101 in FIG. 1b), or may be passed from an upstream node in the questioning and answering flow module (for example, meeting room reservation node 105 in FIG. 1b).

In contrast, if a transaction node in the questioning and answering flow module needs to extract one or more dynamic variables from the user interaction information, it needs to establish a correspondence between the transaction node and a knowledge point in the knowledge base, where the knowledge point corresponding to the transaction nodes (hereinafter referred to as transaction knowledge point) includes a transaction question and a transaction answer.

User input information matches the transaction problem, so that when matching is successful, the corresponding one or more dynamic variables are provided as the transaction information to the transaction node in combination with the transaction answer. If a transaction node in the questioning and answering flow module needs to extract one or more dynamic variables from the upstream node in the questioning and answering flow module, there is no need to establish a correspondence between the transaction node and a transaction knowledge point in the knowledge base, and it only needs to reasonably design process code in the questioning and answering flow module for implementation. Therefore, in practical application, it may determine whether it is necessary to establish a correspondence between the transaction node and the knowledge point in the knowledge base according to actual needs.

Further, considering that the transaction information which can be received by the service interface is required to meet a predetermined format requirement, the user may be required to input the user input information including a dynamic variable according to a data format capable of being recognized by the service interface, and the transaction node may further send the input dynamic variables directly as the transaction information to the service invocation address corresponding to the service interface. In addition, in order to further satisfy user experience, the questioning and answering flow module needs to reduce input requirements to the user as much as possible. Therefore, at the transaction node, the received dynamic variables that fail to satisfy service interface requirement may be converted into transaction information that satisfies the service interface requirement and sent to the service invocation address corresponding to the service interface.

Correspondingly, the custom configuration information further includes: an incoming parameter definition item corresponding to a first transaction node, where the incoming parameter definition item includes at least one incoming parameter name and an incoming parameter variable matched with the incoming parameter name, the incoming parameter name is a parameter name capable of being recognized by a service interface associated with the first transaction node, and the incoming parameter variable matches the dynamic variable input to the first transaction node. The transaction information includes the incoming parameter name and the incoming parameter variable.

Figures 1C, 1D:
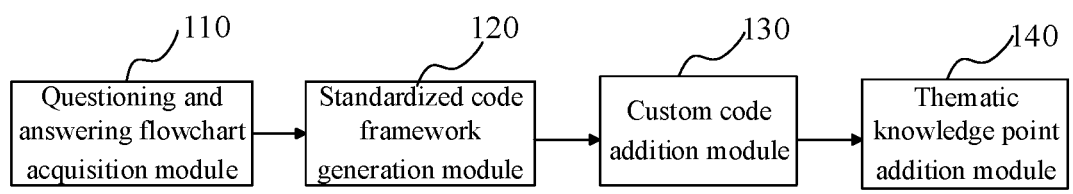
FIG. 1c is a schematic diagram of custom configuration information of an input transaction node applicable to an embodiment of the present invention.
FIG. 1d is a structural diagram of a generation device of a questioning and answering system applicable to an embodiment of the present invention.

FIG. 1c shows a schematic diagram of custom configuration information of an input transaction node. As shown in FIG. 1b, a service invocation address that points to a service interface associated with the transaction node may be input in an invocation address item of a meeting room inquiry node (for example, a meeting room inquiry node 101 in FIG. 1b); a corresponding incoming parameter name (for example, startime and overtime) may be input in an incoming parameter definition item, where the above incoming parameter name is a parameter name capable of being recognized by the service interface; and a corresponding incoming parameter variable (for example, "\${the startime of the meeting}" and \${the overtime of the meeting}) may be input in the incoming parameter definition item. The above incoming parameter variable is matched with the dynamic variable input into the meeting room inquiry node.

More specifically, referring to FIG. 1b, the user input information acquired by the transaction node (i.e., the meeting room inquiry node 101) is "the meeting is from 9:00 am to 11:00 am". By matching the user input information with a transaction knowledge point corresponding to the meeting room inquiry node 101 in the knowledge base, the acquired dynamic variables are as follows: the startime of the meeting=9:00 am, and the overtime of the meeting=11:00 am. The transaction node constructs transaction information (i.e., startime=9:00 am and overtime=11:00 am, which are variable forms capable of being recognized by a service interface for meeting room inquiry) by using the dynamical variables (i.e., the startime of the meeting=9:00 am and the overtime of the meeting=11:00 am). Subsequently, the transaction node transmits the transaction information to a service invocation address (i.e., http://voadev.sh.xaioi.com) corresponding to the service interface and the transaction node can receive a result of meeting room inquiry returned by the service invocation address.

S140. A thematic knowledge point corresponding to each of the questioning and answering flow modules is added in the knowledge base, where the thematic knowledge point includes a thematic question and a thematic answer, the thematic question is used to indicate a trigger condition of the questioning and answering flow module, and the thematic answer is used to establish a trigger relationship between the thematic knowledge point and the questioning and answering flow module.

After the questioning and answering flow module (for implementing code of a questioning and answering process flowchart) is generated, it needs to further add thematic knowledge points corresponding to each of the questioning and answering flow module in the knowledge base in order to implement the normal use of the questioning and answering flow module.

It should be noted that the above solution provides an implementation manner of first generating a questioning and answering flow module, and then establishing a thematic knowledge point, and those skilled in the art can understand that the process of establishing the thematic knowledge point may not be limited to be executed after the generation of the questioning and answering flow module, which is not limited herein. For example, the thematic knowledge point may be established first, and then the corresponding questioning and answering flow module and the like are established.

Actually, the thematic knowledge point differs from a questioning and answering knowledge point in the knowledge base in that: when user input information matches a question in the questioning and answering knowledge point, an answer to the questioning and answering knowledge point is directly output, or a call to a control program that matches content of the answer is performed. When the user input information is matched with a thematic question of a thematic knowledge point, the questioning and answering flow module is triggered correspondingly (for example, a root node of the questioning and answering flow module is directly triggered).

Typically, a thematic answer in a thematic knowledge point may be information such as a storage address or an invocation address of the questioning and answering flow module corresponding to the thematic knowledge point, which can accurately locate the questioning and answering flow module.

FIG. 1d is a structural diagram of a generation device of the above questioning and answering system. The generation device is applicable to a case where a questioning and answering system is generated according to a questioning and answering flowchart, where the questioning and answering system specifically refers to a system that may perform a questioning and answering interaction with an interactive user, and the apparatus device may generally be integrated in a terminal apparatus or a server for generating the questioning and answering system. As shown in FIG. 1d, the apparatus device of this embodiment specifically includes: a questioning and answering flowchart acquisition module 110, a standardized code framework generation module 120, a custom code addition module 130, and a thematic knowledge point addition module 140, where the questioning and answering flowchart acquisition module 110 is configured to acquire one or more graphical questioning and answering flowcharts.

The questioning and answering flowcharts may specifically be graphical flowcharts acquired by selecting and combining various graphic components provided in a set process editing interface.

The graphic components may include nodes and connectors (typically, connecting lines) for connecting different nodes. The nodes include one or more transaction nodes.

The transaction node is associated with a service interface executing a set type service and configured to construct transaction information according to a dynamic variable input to the transaction node, send the transaction information to the associated service interface, and receive a transaction processing result fed back by the service interface.

The service interface is configured to acquire a corresponding transaction processing result through its own processing logic according to input transaction information. For example, a service interface for reserving a meeting room can complete a meeting room reservation operation according to the input meeting room reservation parameters (e.g., the time XX and XX meeting room) as the transaction information by its own processing logic, and then return a result of meeting room reservation, for example, successful reservation or failed reservation, as the transaction processing result; or, a service interface for inquiring a meeting room can complete an operation of inquiring available meeting rooms according to the input meeting room inquiry parameters (e.g., the time XX, the number XX of participants, and meeting rooms with or without a projector) as the transaction information by its own processing logic, and return the information about meeting rooms satisfying the inquiry condition as the transaction processing result.

Based on the above analysis, it can be seen that if one or more service functions that have already been implemented (e.g., meeting room reservation, online train ticket or plane ticket reservation, hospital registration, etc.) are to be used in a questioning and answering system, a service interface matched with the service function may be invoked by introducing a transaction node, and it is unnecessary to write or transplant a program code corresponding to the required service function in the questioning and answering system. Therefore, under the premise of greatly simplifying program codes, the workload required to implement the questioning and answering system is reduced.

In addition, it should be noted that a service interface that can be invoked by a transaction node may also be implemented based on a process code automatically generated by a service flowchart including multiple nodes. The above service flowchart differs from the questioning and answering flowchart in the embodiment of the present invention mainly in that, for the questioning and answering flowchart in the embodiment of the present invention, different proceeding trends of a node in the questioning and answering flowchart are controlled according to content input by the user and questioning and answering interaction with the user during the process execution, while for a service flowchart, simply by receiving one or more pieces of transaction information at the beginning of the proceed, the service flowchart is executed in an given execution order, and the user is not required to input any content.

From an overall structure of a questioning and answering flowchart, one questioning and answering flowchart may include one root node representing the beginning of the process and one or more termination nodes representing the end of the process. Of course, it may be understood that, besides including one or more transaction nodes, the nodes may further include one or more following types of nodes: broadcast nodes, variable set nodes and recording nodes, and this embodiment is not limited hereto. Generally speaking, the root node in a questioning and answering flowchart is a transaction node or an interaction node, and the termination node is a broadcast node.

For ease of understanding, FIG. 1b shows a graphical questioning and answering flowchart. As shown in FIG. 1b, the oval graphic components in the questioning and answering flowchart are transaction nodes (for example, a meeting room inquiry node 101 and a meeting room reservation node 105), the square graphic components are broadcast nodes (for example, a reservation success broadcast node 106), and the diamond graphic component is an interaction node (for example, a node 104 for inquiring whether to confirm a reservation). The nodes are connected by node-to-node connection lines (for example, connection line A and connection line B). Related concepts about interaction nodes and broadcast nodes will be introduced below.

The standardized code framework generation module 120, where the standardized code framework generation module 120 is configured to generate a standardized code framework matched with the questioning and answering flowchart according to each of graphic components included in each of the questioning and answering flowcharts, where the graphic component includes at least one transaction node, and the transaction node is associated with a service interface executing a set type service.

A questioning and answering flow module that may be automatically generated is provided. Correspondingly, standard implementation codes matched with different types of graphic components are provided in advance, for example, the standard implementation codes corresponding to a transaction node, a broadcast node, and a broadcast node are respectively constructed and encapsulated in different library files, and a correspondence between the standard implementation codes and corresponding graphic components is established in advance. Typically, a storage address (or a reference address) of a standard implementation code matched with each graphic component may be written in the process editing interface, and correspondingly, the standardized code framework may be automatically generated for each of the graphic components included in the questioning and answering flowchart drawn based on the process editing interface.

It should be noted that the embodiment of the present invention mainly focuses on a questioning and answering method including a transaction node. Therefore, the questioning and answering flowchart includes one or more transaction nodes. However, the above technical solution may theoretically implement any type of questioning and answering. As long as a corresponding flowchart is drawn according to needs, a corresponding standardized code framework may be acquired, and a corresponding flow module may be acquired.

The custom code addition module 130, where the custom code addition module 130 is configured to, according to custom configuration information matched with each of the graphic components in the questioning and answering flowchart, generate custom codes corresponding to each of the graphic components respectively and add the custom codes at a position associated with the graphic component in the standardized code framework, to generate a questioning and answering flow module corresponding to the questioning and answering flowchart.

It should be understood that the standard implementation code matched with each of the graphic components only includes common functions that can be implemented by the corresponding graphic components. For example, for a transaction node, a corresponding standard time code includes logic for parameter passing. For an interaction node, a corresponding standard implementation code includes determining logic, or for a broadcast node, a corresponding standard implementation code includes broadcast logic and the like. In order to enable a graphic component to implement different functions assigned in different questioning and answering flowcharts, corresponding custom configuration parameters are required to be input.

In a simple example, for node 102 for broadcasting no meeting room being found in FIG. 1b, content of "no meeting room being found" should be broadcasted after the node 102 for broadcasting no meeting room being found is triggered. Correspondingly, the above broadcast content of "no meeting room being found" is a function assigned to the node 102 for broadcasting no meeting room being found. In order to enable the node 102 for broadcasting no meeting room being found to implement the above function, the above broadcast content needs to be added to a code position corresponding to the node 102 for broadcasting no meeting room being found in the standardized code framework as custom configuration information.

Typically, it is possible to reserve a blank code segment at a set position in the standard implementation code matched with each graphic component. When a custom configuration parameter input for a graphic component in the questioning and answering flowchart is acquired (for example, input through a parameter configuration interface provided by the proceed edition interface), a custom code matched with the custom configuration parameter is added in the corresponding blank code segment to realize the custom function of the graphic component.

Optionally, the custom configuration information (for example, no meeting room being found) may be directly added to the standardized code framework as the custom code, or according to set content selected by a user from a custom configuration information input template (for example, an interface transfer mode selected for a transaction node), a prewritten custom code matched with different custom configuration information may be added to the standardized code framework. This will not be limited in this embodiment.

Correspondingly, if custom setting for all graphic components included in a questioning and answering flowchart is completed, an implementation code capable of implementing the function of the questioning and answering flowchart may be generated, that is, the questioning and answering flow module described in the embodiment of the present invention is generated.

Since the transaction node is associated with a service interface executing a set type service, the custom configuration information matched with the transaction node includes a service invocation address corresponding to the transaction node, and the service invocation address points to a service interface associated with the transaction node.

When the target transaction node in the questioning and answering flow module is triggered, the target transaction node constructs target transaction information according to at least one target dynamic variable input to the target transaction node, sends the target transaction information to a corresponding target service invocation address, and returns a transaction processing result fed back by the service invocation address to the questioning and answering flow module, so that the questioning and answering flow module performs further execution according to the transaction processing result.

It should be noted that, when a transaction node is triggered, one or more dynamic variables acquired by and input to the transaction node may be extracted from user interaction information (for example, a meeting room inquiry node 101 in FIG. 1b), or may be passed from an upstream node in the questioning and answering flow module (for example, meeting room reservation node 105 in FIG. 1b).

In contrast, if a transaction node in the questioning and answering flow module needs to extract one or more dynamic variables from the user interaction information, it needs to establish a correspondence between the transaction node and a knowledge point in the knowledge base, where the knowledge point corresponding to the transaction nodes (hereinafter referred to as transaction knowledge point) includes a transaction question and a transaction answer.

User input information matches the transaction problem, so that when matching is successful, the corresponding one or more dynamic variables are provided as the transaction information to the transaction node in combination with the transaction answer. If a transaction node in the questioning and answering flow module needs to extract one or more dynamic variables from the upstream node in the questioning and answering flow module, there is no need to establish a correspondence between the transaction node and a transaction knowledge point in the knowledge base, and it only needs to reasonably design process code in the questioning and answering flow module for implementation. Therefore, in practical application, it may determine whether it is necessary to establish a correspondence between the transaction node and the knowledge point in the knowledge base according to actual needs.

Further, considering that the transaction information which can be received by the service interface is required to meet a predetermined format requirement, the user may be required to input the user input information including a dynamic variable according to a data format capable of being recognized by the service interface, and the transaction node may further send the input dynamic variables directly as the transaction information to the service invocation address corresponding to the service interface. In addition, in order to further satisfy user experience, the questioning and answering flow module needs to reduce input requirements to the user as much as possible. Therefore, at the transaction node, the received dynamic variables that fail to satisfy service interface requirement may be converted into transaction information that satisfies the service interface requirement and sent to the service invocation address corresponding to the service interface.

Correspondingly, the custom configuration information further includes: an incoming parameter definition item corresponding to a first transaction node, where the incoming parameter definition item includes at least one incoming parameter name and an incoming parameter variable matched with the incoming parameter name, the incoming parameter name is a parameter name capable of being recognized by a service interface associated with the first transaction node, and the incoming parameter variable matches the dynamic variable input to the first transaction node. The transaction information includes the incoming parameter name and the incoming parameter variable.

FIG. 1c shows a schematic diagram of custom configuration information of an input transaction node. As shown in FIG. 1b, a service invocation address that points to a service interface associated with the transaction node may be input in an invocation address item of a meeting room inquiry node (for example, a meeting room inquiry node 101 in FIG. 1b); a corresponding incoming parameter name (for example, startime and overtime) may be input in an incoming parameter definition item, where the above incoming parameter name is a parameter name capable of being recognized by the service interface; and a corresponding incoming parameter variable (for example, "$ {the startime of the meeting}" and $ {the overtime of the meeting}) may be input in the incoming parameter definition item. The above incoming parameter variable is matched with the dynamic variable input into the meeting room inquiry node.

More specifically, referring to FIG. 1b, the user input information acquired by the transaction node (i.e., the meeting room inquiry node 101) is "the meeting is from 9:00 am to 11:00 am". By matching the user input information with a transaction knowledge point corresponding to the meeting room inquiry node 101 in the knowledge base, the acquired dynamic variables are as follows: the startime of the meeting=9:00 am, and the overtime of the meeting=11:00 am. The transaction node constructs transaction information (i.e., startime=9:00 am and overtime=11:00 am, which are variable forms capable of being recognized by a service interface for meeting room inquiry) by using the dynamical variables (i.e., the startime of the meeting=9:00 am and the overtime of the meeting=11:00 am). Subsequently, the transaction node transmits the transaction information to a service invocation address (i.e., http://voadev.sh.xaioi.com) corresponding to the service interface and the transaction node can receive a result of meeting room inquiry returned by the service invocation address.

The thematic knowledge point addition module 140, where the thematic knowledge point addition module 140 is configured to add a thematic knowledge point corresponding to each of the questioning and answering flow modules in the knowledge base, where the thematic knowledge point includes a thematic question and a thematic answer, the thematic question is used to indicate a trigger condition of the questioning and answering flow module, and the thematic answer is used to establish a trigger relationship between the thematic knowledge point and the questioning and answering flow module.

After the questioning and answering flow module (for implementing code of a questioning and answering process flowchart) is generated, it needs to further add thematic knowledge points corresponding to each of the questioning and answering flow module in the knowledge base in order to implement the normal use of the questioning and answering flow module.

It should be noted that the above solution provides an implementation manner of first generating a questioning and answering flow module, and then establishing a thematic knowledge point, and those skilled in the art can understand that the process of establishing the thematic knowledge point may not be limited to be executed after the generation of the questioning and answering flow module, which is not limited herein. For example, the thematic knowledge point may be established first, and then the corresponding questioning and answering flow module and the like are established.

Actually, the thematic knowledge point differs from a questioning and answering knowledge point in the knowledge base in that: when user input information matches a question in the questioning and answering knowledge point, an answer to the questioning and answering knowledge point is directly output, or a call to a control program that matches content of the answer is performed. When the user input information is matched with a thematic question of a thematic knowledge point, the questioning and answering flow module is triggered correspondingly (for example, a root node of the questioning and answering flow module is directly triggered).

Typically, a thematic answer in a thematic knowledge point may be information such as a storage address or an invocation address of the questioning and answering flow module corresponding to the thematic knowledge point, which can accurately locate the questioning and answering flow module.

Based on a graphical questioning and answering flowchart and custom configuration information set for each of the graphic components in the questioning and answering flowchart, a method for generating the above questioning and answering system and a generation device may automatically generate the questioning and answering flow module for implementing a function of the questioning and answering flowchart, and then by a manner of adding a thematic knowledge point corresponding to each of the questioning and answering flow modules in the knowledge base, may flexibly implement use of a questioning and answering system generated based on the questioning and answering flow module, thereby providing a method for generating the questioning and answering system realized by a WYSIWYG manner, and optimizing an implementation manner of the existing questioning and answering system. In addition, by introducing a transaction node in the graphic component, a quick call to an existing function or service may be realized, and a business attribute required in a business process may be acquired, thereby avoiding repeated writing or transplanting of the codes that implements the same function, ensuring simplicity that the questioning and answering system implements the code, reducing workload and error probability of developers, realizing rapid construction and update of the questioning and answering system, and avoiding introduction of the developers in the process of generating the questioning and answering system, thereby greatly reducing the workload of the developers, reducing a cost, and increasing accuracy and efficiency.

Further, as described above, if a transaction node in the questioning and answering flow module needs to extract one or more dynamic variables from user interaction information, the questioning and answering method further includes establishing, in the knowledge base, a transaction knowledge point corresponding to the transaction node. The transaction knowledge point includes a transaction question and a transaction answer.

The transaction question is used to match transaction information input into the transaction node, and the transaction answer is used to combine with at least one transaction parameter extracted from successfully fuzzy-matched transaction information to generate a dynamic variable. Table 1 shows a data structure of the transaction knowledge point.

TABLE 1

| Transaction question | Transaction answer |
| --- | --- |
| Inquiry a meeting room for time XX, number of participants XX and meeting type XX | Scene (meeting room inquiry, meeting participants=$ [@ participants], meeting time=$ [@ time], meeting type=$ [@ meeting type]) |

As shown in Table 1, when a transaction node that needs to extract one or more dynamic variables from the user interaction information (for example, a meeting room inquiry node 101 in FIG. 1b) is triggered, the user input information matches (typically, by fuzzy-matched) transaction problem corresponding to the transaction node. If the user input information is successfully matched with the transaction question, the specific content (the actual content of the dynamic variables contained in the transaction question), such as the time, the number of participants and the type of the meeting, is determined according to the transaction question, the specific content is combined with the transaction answer to acquire complete dynamic variables, and the complete dynamic variables are fed back to the corresponding meeting room inquiry node 101 (i.e., the name of the meeting room inquiry node in the corresponding transaction answer).

More specifically, if the user input information acquired for the meeting room inquiry node 101 in FIG. 1b is: "I want to inquiry a meeting room with a projector from 9:00 am to 12:00 am tomorrow, and there are three participants", by matching the user input information with a transaction knowledge point in Table 1, it is determined that there are three participants, the time is from 9:00 am to 12:00 am, and the type of the meeting is projector. Subsequently, the information matches the transaction answer to acquire complete dynamic variables (i.e., "the number of meeting participants=3", "the meeting time=9:00 am to 12:00 am" and "the type of the meeting=projector"), and the complete dynamic variables are input to the meeting room inquiry node 101. The meeting room inquiry node 101 constructs, by the dynamic variables, transaction information that can be recognized by a service interface, and then transmits the transaction information to the corresponding service interface.

In this way, the universality of the transaction node can be further improved, and the transaction node can be used in combination with the existing knowledge base. However, there is a problem in setting the transaction knowledge point through the data structure as described in Table 1, that is, it requires that the user input information includes all dynamic variables required by the transaction node or the service interface before the service interface is triggered to return the corresponding transaction processing result. Once the dynamic variables included in the user input information are incomplete, it needs to re-input all the dynamic variables completely, so that interactivity and intelligence are slightly worse, which will affect user experience to a certain extent. On such a basis, another data structure of the transaction knowledge point is provided below, which can adjust output speech correspondingly according to missing dynamic variable in the user input information when the dynamic variables included in the user input information are incomplete, so as to enable the user to supplement the missing dynamic variables conveniently and fast in subsequent input information, thereby further improving user experience and questioning efficiency of the questioning and answering system.

Figure 2:
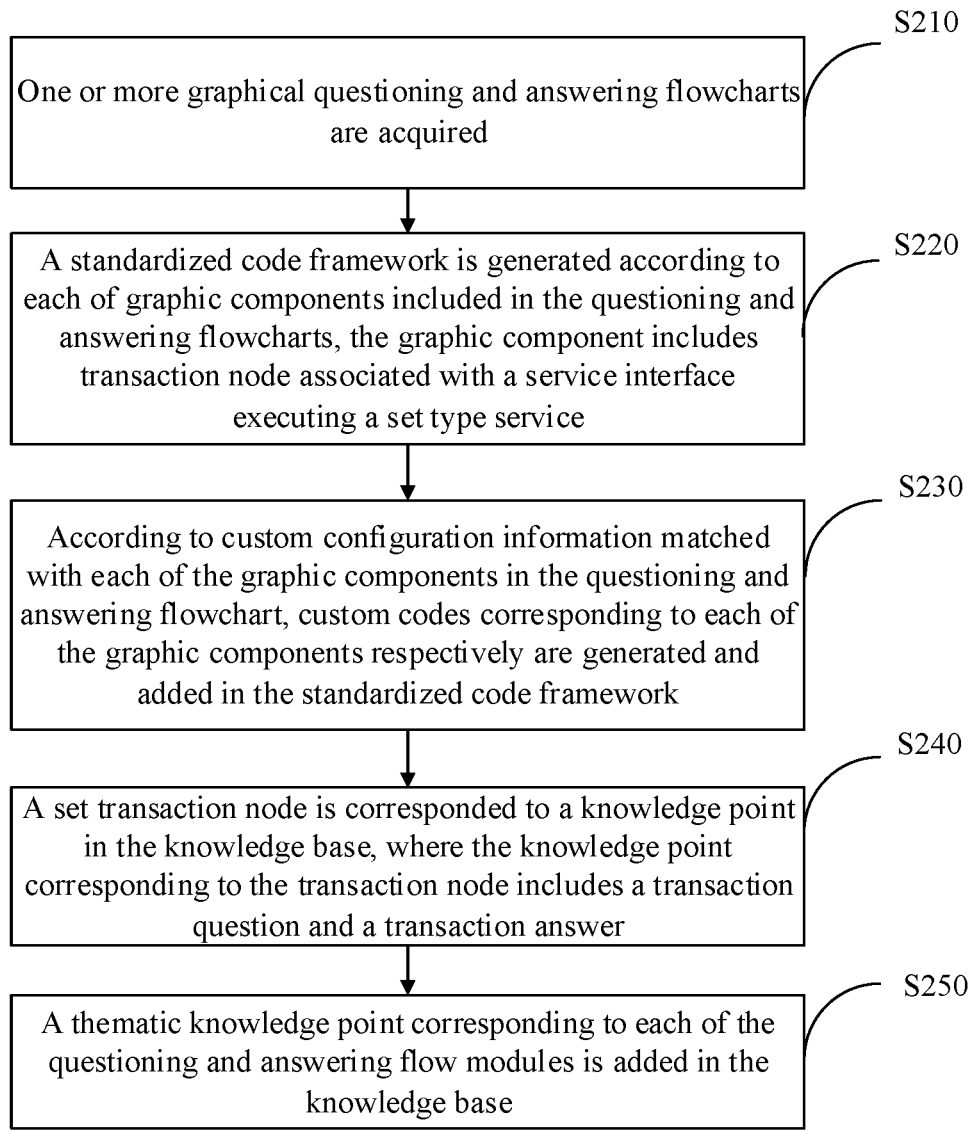
FIG. 2 is a flowchart of a method for generating another questioning and answering system applicable to an embodiment of the present invention.

FIG. 2 is a flowchart of another method for generating the above questioning and answering system, in which another data structure corresponding to a transaction knowledge point is provided for the transaction node that needs to extract one or more dynamic variables from user interaction information. Correspondingly, the above method includes:

S210. One or more graphical questioning and answering flowcharts are acquired.

S220. A standardized code framework matched with the questioning and answering flowchart is generated according to each of graphic components included in each of the questioning and answering flowcharts, where the graphic component includes at least one transaction node, and the transaction node is associated with a service interface executing a set type service; and S230. According to custom configuration information matched with each of the graphic components in the questioning and answering flowchart, custom codes corresponding to each of the graphic components respectively are generated and added at a position associated with the graphic component in the standardized code framework, to generate a questioning and answering flow module corresponding to the questioning and answering flowchart, where the custom configuration information matched with the transaction node includes a service invocation address corresponding to the transaction node, and the service invocation address points to a service interface associated with the transaction node.

When the target transaction node in the questioning and answering flow module is triggered, the target transaction node constructs target transaction information according to at least one target dynamic variable input to the target transaction node, sends the target transaction information to a corresponding target service invocation address, and returns a transaction processing result fed back by the service invocation address to the questioning and answering flow module, so that the questioning and answering flow module performs further execution according to the transaction processing result.

S240. A set transaction node is corresponded to one knowledge point in the knowledge base, where the knowledge point corresponding to the transaction node includes a transaction question and a transaction answer.

As described above, if one or more transaction nodes in a questioning and answering flow module need to extract one or more dynamic variables from user interaction information, a correspondence between the above transaction node and a knowledge point (that is, a transaction knowledge point) in the knowledge base needs to be established. In order to solve a problem of the transaction knowledge point in Table 1, this embodiment provides a data structure of another transaction knowledge point.

The transaction answer includes an associated transaction node, a type of at least one incoming parameter, a type of at least one missing parameter, and counter-question content matched with the type of the missing parameter.

The transaction question is used to match received user input information.

The type of the incoming parameter is used to match a type of a dynamic variable included in the user input information; the type of the missing parameter and the counter-question content matched with the type of the missing parameter are used to determine counter-question content corresponding to the type of the missing parameter in the user input information; and the associated transaction node is used to determine a transaction node to which the dynamic variable contained in the user input information is input.

Table 2 shows a specific data structure of the above transaction knowledge point.

TABLE 2

| Transaction question | Transaction answer |
|---|---|
| Inquiry a meeting room for time XX, number of participants XX and meeting type XX | Scene (meeting room inquiry, meeting time=$ [@ time], meeting participants=$ [@ participants], meeting type=$ [@ meeting type]) [@time]=What time do you want a meeting room"; [@number of participants]= the number of participants; [@ meeting type]=What's your required apparatus; [@number of participants][@ meeting type]= the number of meeting participants and the required apparatus |

As shown in Table 2, in the transaction knowledge point, the transaction problem is used to match received user input information, and acquire specific content of one or more of the time, the number of participants, and the meeting type included in the user input information. A type of at least one incoming parameter included in the transaction answer may specifically include: a meeting time, a number of participants, or a meeting type, which is used to match a type of a dynamic variable included in the user input information.

If it is determined that types of all incoming parameters defined in the transaction answer are included in the user input information, the above specific content and the types of the incoming parameter included in the transaction answer are combined to construct dynamic variables, which are sent to an associated transaction node of the transaction answer, that is, the transaction node of "meeting room inquiry".

In addition, the type of at least one missing parameter, and counter-question content matched with the type of the missing parameter are further defined in the transaction knowledge point. For example, "[@time]=What time do you want a meeting room, please", where "[@time]" corresponds to the type of the missing parameter, and "What time do you want a meeting room, please" corresponds to the corresponding counter-question content. In other words, if the user input information does not include the specific content of the meeting time, the corresponding counter-question content "What time do you want a meeting room, please" may be provided for a user based on the above transaction knowledge point, so as to request the user to input specific content including the meeting time again. For another example, for "[@number of participants] [@meeting type] =the number of meeting participants and the required apparatus", "[@number of participants][@ meeting type]" corresponds to the type of the missing parameter, and "the number of participants and the required apparatus" corresponds to the corresponding counter-question content. In other words, if the user input information does not include specific content of the number of meeting participants and meeting type, the corresponding counter-question content "the number of participants and required apparatus" may be provided for the user based on the above transaction knowledge point, so as to request the user to input specific content including the number of participants and meeting type again.

By adopting the data structure of the transaction knowledge point described in Table 2, a data format of the user input information input to the transaction node may not be strictly defined. Based on the above transaction knowledge point, the corresponding counter-question content may be returned to the user according to the type of missing dynamic variable in the user input information, so that the user corrects user input content according to the counter-question content, and only provides the missing dynamic variable, and dynamic variables that have been provided do not need to be provided again. The transaction node can be triggered and work normally, and meanwhile, requirements for user input information are greatly reduced, and questioning and answering efficiency of the questioning and answering system and user experience can be significantly improved.

Correspondingly, enabling a set transaction node to correspond to one knowledge point in the knowledge base may include: if it is determined that the transaction knowledge point matching the transaction node is included in the knowledge base, directly establishing a correspondence therebetween in the knowledge base; if it is determined that the transaction knowledge point matching the transaction node is not included in the knowledge base, establishing the transaction knowledge point in the knowledge base first, and then establishing a correspondence therebetween.

In addition, it needs to be explained again that the transaction node is significantly different from the questioning and answering knowledge point mentioned above. As mentioned above, the so-called questioning and answering knowledge point generally includes a question and a corresponding answer (also referred to as a "question-answer" pair), where the questioning and answering knowledge point is mainly applicable to a scenario in which an interactive user performs questioning and answering. A question in the questioning and answering knowledge point is used to match user input information, and if the matching is successful, an answer in the questioning and answering knowledge point is fed back, or a call to a control program that matches content of the answer is performed.

In other words, the questioning and answering knowledge point can directly determine a processing result corresponding to the user input information (for example, by feeding back the content of the answer or executing a call to the set control program), and the transaction knowledge point is used to match and determine dynamic variables input to the corresponding transaction node, so that they are available for different uses. In order to facilitate the distinction between the above two types of knowledge points in different application scenarios, the transaction knowledge point and the questioning and answering knowledge point may be stored in different storage locations in the knowledge base, or a knowledge point label different from the questioning and answering knowledge point is added to an transaction knowledge point or the like.

When the questioning and answering knowledge point is different from the transaction knowledge point, the two may not be distinguished, and they are all within the protection scope of the present invention.

S250. A thematic knowledge point corresponding to each of the questioning and answering flow modules is added in the knowledge base, where the thematic knowledge point includes a thematic question and a thematic answer, the thematic question is used to indicate a trigger condition of the questioning and answering flow module, and the thematic answer is used to establish a trigger relationship between the thematic knowledge point and the questioning and answering flow module.

Figure 3:
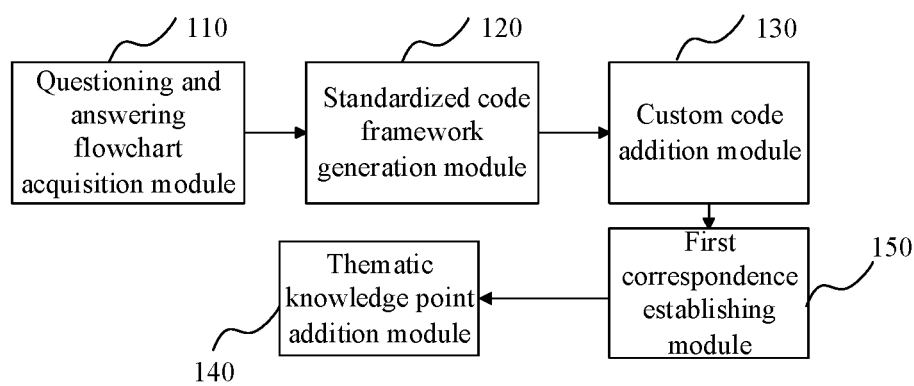
FIG. 3 is a structural diagram of a generation device of another questioning and answering system applicable to an embodiment of the present invention.

FIG. 3 is a structural diagram of a generation device of another questioning and answering system, in which another data structure of a corresponding transaction knowledge point is provided for a transaction node that needs to extract one or more dynamic variables from user interaction information. Correspondingly, the generation device includes: a questioning and answering flowchart acquisition module 110, a standardized code framework generation module 120, a custom code addition module 130, a first correspondence establishing module 150, and a thematic knowledge point addition module 140.

The questioning and answering flowchart acquisition module 110 is configured to acquire one or more graphical questioning and answering flowcharts.

The standardized code framework generation module 120 is configured to generate a standardized code framework matched with the questioning and answering flowchart according to each of graphic components included in each of the questioning and answering flowcharts, where the graphic component includes at least one transaction node, and the transaction node is associated with a service interface executing a set type service.

The custom code addition module 130 is configured to, according to custom configuration information matched with each of the graphic components in the questioning and answering flowchart, generate custom codes corresponding to each of the graphic components respectively and add the custom codes at a position associated with the graphic component in the standardized code framework, to generate a questioning and answering flow module corresponding to the questioning and answering flowchart.

Where the custom configuration information matched with the transaction node includes a service invocation address corresponding to the transaction node, and the service invocation address points to a service interface associated with the transaction node.

When the target transaction node in the questioning and answering flow module is triggered, the target transaction node constructs target transaction information according to at least one target dynamic variable input to the target transaction node, sends the target transaction information to a corresponding target service invocation address, and returns a transaction processing result fed back by the service invocation address to the questioning and answering flow module, so that the questioning and answering flow module performs further execution according to the transaction processing result.

The correspondence establishing module 150, where the correspondence establishing module 150 is configured to enable a set transaction node to correspond to one knowledge point in the knowledge base, where the knowledge point corresponding to the transaction node includes a transaction question and a transaction answer.

As described above, if one or more transaction nodes in a questioning and answering flow module need to extract one or more dynamic variables from user interaction information, a correspondence between the above transaction node and a knowledge point (that is, a transaction knowledge point) in the knowledge base needs to be established. In order to solve a problem of the transaction knowledge point in Table 1, this embodiment provides a data structure of another transaction knowledge point.

The transaction answer includes an associated transaction node, a type of at least one incoming parameter, a type of at least one missing parameter, and counter-question content matched with the type of the missing parameter.

The transaction question is used to match received user input information.

The type of the incoming parameter is used to match a type of a dynamic variable included in the user input information; the type of the missing parameter and the counter-question content matched with the type of the missing parameter are used to determine counter-question content corresponding to the type of the missing parameter in the user input information; and the associated transaction node is used to determine a transaction node to which the dynamic variable contained in the user input information is input.

Table 3 shows a specific data structure of the above transaction knowledge point.

TABLE 3

| Transaction question | Transaction answer |
| --- | --- |
| Inquiry a meeting room for time XX, number of participants XX and meeting type XX | Scene (meeting room inquiry, meeting time=$ [@ time], meeting participants=$ [@ participants], meeting type=$ [@ meeting type]) [@time]=What time do you want a meeting room"; [@number of participants]= the number of participants; [@ meeting type]=What's your required apparatus; [@number of participants][@ meeting type]= the number of meeting participants and the required apparatus |

As shown in Table 3, in the transaction knowledge point, the transaction problem is used to match received user input information, and acquire specific content of one or more of the time, the number of participants, and the meeting type included in the user input information. A type of at least one incoming parameter included in the transaction answer may specifically include: a meeting time, a number of participants, or a meeting type, which is used to match a type of a dynamic variable included in the user input information.

If it is determined that types of all incoming parameters defined in the transaction answer are included in the user input information, the above specific content and the types of the incoming parameter included in the transaction answer are combined to construct dynamic variables, which are sent to an associated transaction node of the transaction answer, that is, the transaction node of "meeting room inquiry".

In addition, the type of at least one missing parameter, and counter-question content matched with the type of the missing parameter are further defined in the transaction knowledge point. For example, "[@time]=What time do you want a meeting room, please", where "[@time]" corresponds to the type of the missing parameter, and "What time do you want a meeting room, please" corresponds to the corresponding counter-question content. In other words, if the user input information does not include the specific content of the meeting time, the corresponding counter-question content "What time do you want a meeting room, please" may be provided for a user based on the above transaction knowledge point, so as to request the user to input specific content including the meeting time again. For another example, for "[@number of participants] [@meeting type] =the number of meeting participants and the required apparatus", "[@number of participants][@meeting type]" corresponds to the type of the missing parameter, and "the number of participants and the required apparatus" corresponds to the corresponding counter-question content. In other words, if the user input information does not include specific content of the number of meeting participants and meeting type, the corresponding counter-question content "the number of participants and required apparatus" may be provided for the user based on the above transaction knowledge point, so as to request the user to input specific content including the number of participants and meeting type again.

By adopting the data structure of the transaction knowledge point described in Table 3, a data format of the user input information input to the transaction node may not be strictly defined. Based on the above transaction knowledge point, the corresponding counter-question content may be returned to the user according to the type of missing dynamic variable in the user input information, so that the user corrects user input content according to the counter-question content, and only provides the missing dynamic variable, and dynamic variables that have been provided do not need to be provided again. The transaction node can be triggered and work normally, and meanwhile, requirements for user input information are greatly reduced, and questioning and answering efficiency of the questioning and answering system and user experience can be significantly improved.

Correspondingly, the first correspondence establishing module 150 may be specifically configured to: if it is determined that the transaction knowledge point matching the transaction node is included in the knowledge base, directly establish a correspondence therebetween in the knowledge base; if it is determined that the transaction knowledge point matching the transaction node is not included in the knowledge base, establish the transaction knowledge point in the knowledge base first, and then establish a correspondence therebetween.

In addition, it needs to be explained again that the transaction node is significantly different from the questioning and answering knowledge point mentioned above. As mentioned above, the so-called questioning and answering knowledge point generally includes a question and a corresponding answer (also referred to as a "question-answer" pair), where the questioning and answering knowledge point is mainly applicable to a scenario in which an interactive user performs questioning and answering. A question in the questioning and answering knowledge point is used to match user input information, and if the matching is successful, an answer in the questioning and answering knowledge point is fed back, or a call to a control program that matches content of the answer is performed.

In other words, the questioning and answering knowledge point can directly determine a processing result corresponding to the user input information (for example, by feeding back the content of the answer or executing a call to the set control program), and the transaction knowledge point is used to match and determine dynamic variables input to the corresponding transaction node, so that they are available for different uses. In order to facilitate the distinction between the above two types of knowledge points in different application scenarios, the transaction knowledge point and the questioning and answering knowledge point may be stored in different storage locations in the knowledge base, or a knowledge point label different from the questioning and answering knowledge point is added to an transaction knowledge point or the like.

When the questioning and answering knowledge point is different from the transaction knowledge point, the two may not be distinguished, and they are all within the protection scope of the present invention.

The thematic knowledge point addition module 140, where the knowledge point addition module 140 is configured to add a thematic knowledge point corresponding to each of the questioning and answering flow modules in the knowledge base. The thematic knowledge point includes a thematic question and a thematic answer, the thematic question is used to indicate a trigger condition of the questioning and answering flow module, and the thematic answer is used to establish a trigger relationship between the thematic knowledge point and the questioning and answering flow module.

According to the above technical solution, by establishing a correspondence between a transaction node and a transaction knowledge point in a knowledge base and defining, in this transaction knowledge point, counter-question content when the user input information does not include one or more dynamic variables required by the transaction node, different counter-question content can be fed back according to different user input information when the finally constructed questioning and answering system is controlled to proceed to a transaction node matched with the transaction knowledge point, so that the user can correct the content input by the user according to the counter-question content. Only the missing dynamic variables are required to be offered, and it is unnecessary to provide the dynamic variables that have already been offered. The transaction node can be triggered and operated normally, and meanwhile, requirements for user input information are greatly reduced, and questioning and answering efficiency of the questioning and answering system and user experience can be significantly improved.

Further, the graphic component may further include a connector for connecting different nodes, for example, as shown in FIG. 1*b*, a connector A for connecting a meeting room inquiry node 101 and a node 102 for broadcasting no meeting room being found, a connector B for connecting the meeting room inquiry node 101 and a node 104 for inquiring whether to confirm a reservation, and a connector C for connecting the meeting room inquiry node 101 and a node 103 for broadcasting a list of meeting rooms for the user to choose.

Correspondingly, the custom configuration information includes dynamic condition configuration information matched with a first connector.

The first connector is used to connect an association upper node and an association lower node, and the association upper node is a second transaction node.

The dynamic condition configuration information is a condition that the questioning and answering flow module is proceeded from the association upper node to the association lower node, where the dynamic condition configuration information includes an outputting parameter definition item and a condition set value, where the outputting parameter definition item corresponds to at least one transaction processing result received by the transaction node, and the condition set value is used for conditional comparison with the transaction processing result in the outputting parameter definition item.

In a specific example, a manner of "${transaction node name}. variable name+relational operator+variable value" is used to set the dynamic condition configuration information corresponding to the first connector.

The ${transaction node name}. variable name is the outputting parameter definition item, which represents at least one transaction processing result received by the transaction node, and the condition set value corresponding to the variable value is used for conditional comparison with the transaction processing result in the outputting parameter definition item.

More specifically, as shown in FIG. 1*b*, the connector A, the connector B, and the connector C are connectors for connecting a transaction node (a meeting room inquiry node 101) to other nodes. Assuming that the meeting room inquiry node 101 receives that a transaction processing result returned from the corresponding service interface is the number of the meeting rooms that satisfy the condition (transaction information constructed according to the user input information), dynamic condition configuration information corresponding to the connector A may be constructed correspondingly as "$ {transaction node name}.code=0", dynamic condition configuration information corresponding to the connector B is "${transaction node name}.code=1", and dynamic condition configuration information corresponding to the connector C is "${transaction node name}.code>1".

The ${transaction node name}.code represents the transaction processing result received by the transaction node, and "=" and ">" are relational operators between the transaction processing result and a corresponding condition set value.

In other words, if the meeting room inquiry node 101 receives that the transaction processing result returned from the corresponding service interface is 1, the dynamic condition configuration information corresponding to the above transaction processing result is "${transaction node name}.code=1". Correspondingly, the questioning and answering system will proceed from the meeting room inquiry node 101 to a node 104 for inquiring whether to confirm a reservation for further execution.

Further, the graphic component further includes an interaction node.

Correspondingly, the method further includes: establishing a correspondence between each of the interaction nodes and one or more knowledge points in the knowledge base, where the knowledge points corresponding to the interaction node includes: an interaction problem and an interaction answer, the interaction problem is used to match received user interaction information, and the interaction answer is used to determine a next proceeding trend of the questioning and answering flow module.

The interaction node specifically refers to a node that can interact with an interaction user (may be questioning once and answering once, or questioning once and answering multiple times). At the interaction node, a next proceeding trend of the questioning and answering system may be determined according to the user interaction information input by the user.

For example, as shown in FIG. 1*b*, the node 104 for inquiring whether to confirm a reservation is an interaction node. If it is determined that a user inputs "NO" based on the node 104 for inquiring whether to confirm a reservation, a next proceeding trend for the questioning and answering system is determined as END; if it is determined that the user inputs "YES" based on the node 104 for inquiring whether to confirm a reservation, a next proceeding trend of the questioning and answering system is determined as the meeting room reservation node 105.

Further, the interaction node needs to determine the next proceeding trend of the established questioning and answering flow module according to the user interaction information. That is, the interaction node includes at least two branches, and different branches correspond to different proceeding trends of the questioning and answering flow module. Therefore, different branch conditions need to be set for different branches in the questioning and answering flow module.

Actually, an expression manner of the user interaction information input by the user under one interaction node may not be unique, or a plurality of different pieces of user interaction information may correspond to a same branch condition. As shown in FIG. 1b, for example, it may be pre-defined that when the user interaction information is "NO" or "NOT SURE", the questioning and answering system will proceed to END. Therefore, it is necessary to establish, in the knowledge base, interaction knowledge points (NO, NO) and (NOT SURE, NO) matched with the interaction node, and a correspondence between the above interaction knowledge points and the node 104 for inquiring whether to confirm a reservation is established respectively. Similarly, it may be pre-defined at the same time that when the user interaction information is "YES" or "OK", the questioning and answering system will proceed to END. Thus, it is also necessary to establish, in the knowledge base, interaction knowledge points (YES, YES) and (OK, YES) matched with the interaction node.

Therefore, the node 104 for inquiring whether to confirm a reservation needs to establish a correspondence with the four interaction knowledge points. It should be understood that the knowledge points corresponding to the interaction nodes are different from questioning and answering knowledge points in the prior art. Therefore, in order to facilitate the distinction, the knowledge points corresponding to the interaction nodes are collectively referred to as interaction knowledge points.

The first half part in each bracket represents an interaction problem in an interactive knowledge points and is used for matching the received user interaction information, and the second half part in each bracket represents an interactive answer in the interaction knowledge points and is used for determining the next proceeding trend of the questioning and answering flow module.

Further, the graphic component further includes a broadcast node. The broadcast node is used for broadcasting the broadcast content preset by custom configuration information. For example, FIG. 1b shows a node 102 for broadcasting no meeting room being found, a node 103 for broadcasting a list of meeting rooms for the user to choose, a reservation success broadcast node 106, and a cause-of-failure broadcast node 107. For example, when the questioning and answering system is proceeded to the node 102 for broadcasting no meeting room being found, the broadcast node will correspondingly broadcast "Sorry, no meeting room satisfying the conditions is found".

Further, in addition to setting broadcast content for the broadcast node, broadcast content may further be set for other types of nodes, so that each node in the questioning and answering system can better perform questioning and answering interaction with a user.

Correspondingly, the custom configuration information further includes: broadcast content corresponding to a first node; the first node is connected to a third transaction node through a connector, and the first node is located downstream of the third transaction node and includes an interaction node, a broadcast node or another transaction node.

The broadcast content includes the transaction processing result received by the third transaction node, a combination of the transaction processing result received by the third transaction node and preset information, or a combination of the transaction processing result received by the third transaction node and a dynamic variable input to the third transaction node.

Specifically, as shown in FIG. 1b, the node 104 for inquiring whether to confirm a reservation is an interaction node connected to a transaction node (i.e., the meeting room inquiry node 101) via a connector. Therefore, for this interaction node, it is possible to set different types of broadcast content matched with the transaction processing result received by the meeting room inquiry node 101. For example, the broadcast content containing only the transaction process result is "There is a meeting room satisfying the conditions"; or, the broadcast content containing the combination of the transaction processing result and the preset information is "In accordance with your input meeting room inquiry conditions, there is only one meeting room satisfying the conditions"; or, the broadcast content containing the combination of the transaction processing result and the dynamic variable input to this transaction node is "There is only one meeting room satisfying the meeting time XX, XX meeting participants and meeting type XX".

It should be understood that the embodiment merely shows several methods of setting the broadcast content. Actually, those skilled in the art can set the desired broadcast content corresponding to a code according to the actual situation, and this will not be limited in the embodiment.

Further, the broadcast content may be list data. For example, for the node 103 for broadcasting a list of meeting rooms for the user to choose shown in FIG. 1b, it can be known from the above analysis that, when it is determined there is more than one meeting room satisfying the conditions, it will proceed to this node. Therefore, the broadcast content of the node 103 broadcasting a list of meeting rooms for the user to choose can be correspondingly set as list data, so that the node can broadcast multiple meeting rooms satisfying the conditions, for example, broadcasting "the meeting rooms satisfying the meeting time XX, XX meeting participants and the meeting type XX are as follows: meeting room A1, meeting room B2 . . . ".

Typically, when the user double-clicks or clicks a graphic component in a questioning and answering flowchart, an input template for the custom configuration information is correspondingly popped up, and a flow designer can input different custom configuration information for different graphic components by simple selection and input operations.

Figure 4:
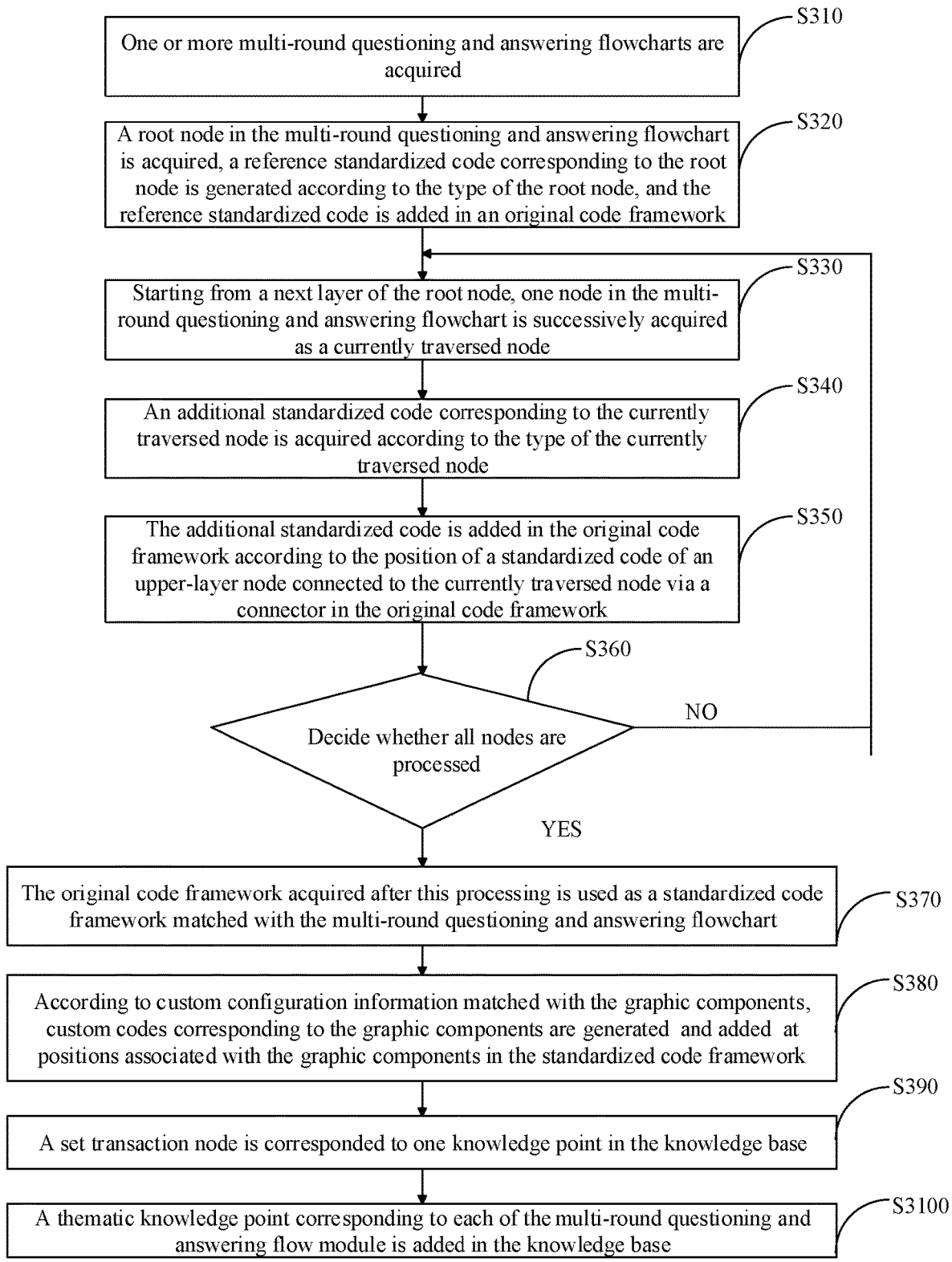
FIG. 4 is a flowchart of a method for generating another questioning and answering system applicable to an embodiment of the present invention.

FIG. 4 is a flowchart of the method for generating a questioning and answering system according to an embodiment of the present invention. This embodiment is optimized based on the above embodiments. In this embodiment, the operation of generating, according to graphic components contained in each of the questioning and answering flowcharts, a standardized code framework matched with the questioning and answering flowchart is subdivided. Correspondingly, the method in this embodiment of the present invention includes the following steps.

S310. One or more graphical questioning and answering flowcharts are acquired.

S320. A root node in the questioning and answering flowchart is acquired, a reference standardized code corresponding to the root node is generated according to the type of the root node, and the reference standardized code is added in an original code framework.

S330. Starting from a next layer of the root node, one node in the questioning and answering flowchart is successively acquired as a currently traversed node.

Typically, if there are multiple nodes in the next layer of the root node, in a certain traversal order, for example, from left to right or from right to left, all nodes in this layer are traversed, and nodes in the next layer are then traversed.

S340. An additional standardized code corresponding to the currently traversed node is acquired according to the type of the currently traversed node.

S350. The additional standardized code is correspondingly added in the original code framework according to the position of a standardized code of an upper-layer node connected to the currently traversed node via a connector in the original code framework.

S360. It is determined whether all nodes in the questioning and answering flowchart are processed; if so, S370 is executed; if not, the process is returned to S330.

S370. The original code framework acquired after this processing is used as a standardized code framework matched with the questioning and answering flowchart.

It is to be noted that, in this embodiment of the present invention, a method for generating a standardized code framework according to the already drawn questioning and answering flowchart is provided. Actually, the standardized code framework may be updated and generated in real time during the drawing of the questioning and answering flowchart. In this embodiment, the time for generating the standardized code framework will not be limited.

S380. According to custom configuration information matched with each of the graphic components in the questioning and answering flowchart, custom codes corresponding to each of the graphic components respectively are generated and added at a position associated with the graphic component in the standardized code framework, to generate a questioning and answering flow module corresponding to the questioning and answering flowchart.

S390. A set transaction node is corresponded to one knowledge point in the knowledge base.

S3100. A thematic knowledge point corresponding to each of the questioning and answering flow modules is added in the knowledge base, where the thematic knowledge point includes a thematic question and a thematic answer, the thematic question is used to indicate a trigger condition of the questioning and answering flow module, and the thematic answer is used to establish a trigger relationship between the thematic knowledge point and the questioning and answering flow module.

Figure 5:
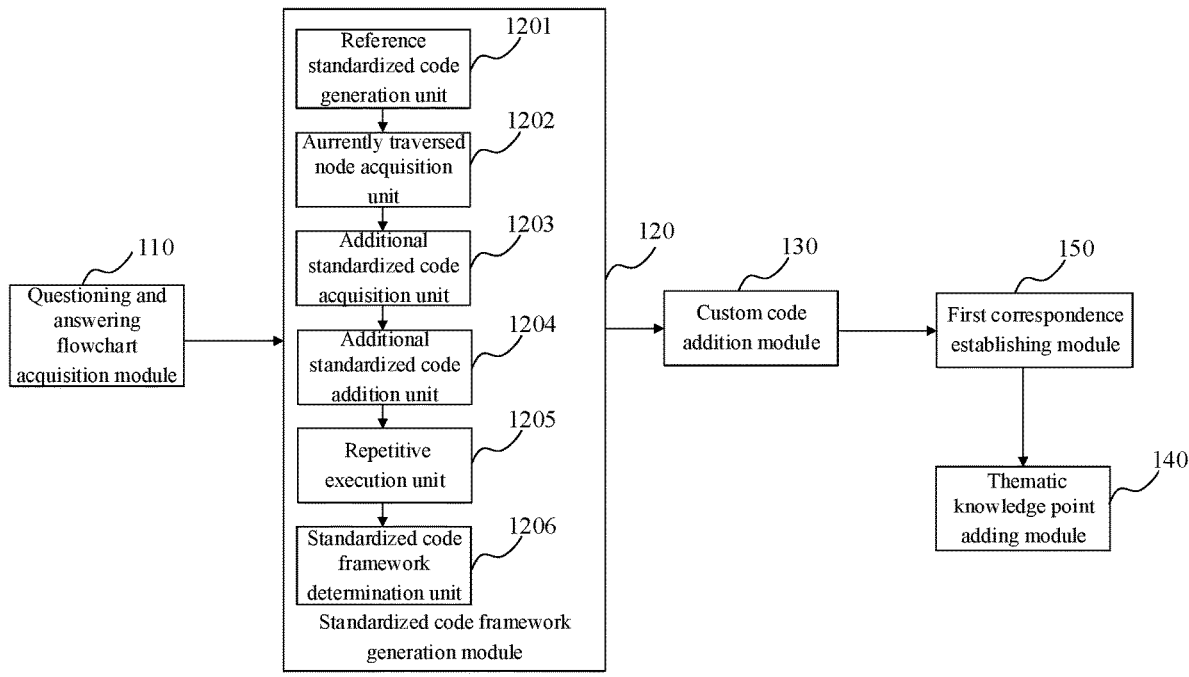
FIG. 5 is a structural diagram of a generation device of another questioning and answering system applicable to an embodiment of the present invention.

An embodiment of the present invention also provides a generation device of a questioning and answering system. As shown in FIG. 5, this embodiment is optimized based on the above embodiments. In this embodiment, a standardized code framework generation module is subdivided. Correspondingly, the device of this embodiment includes: a questioning and answering flowchart acquisition module 110, a standardized code framework generation module 120, a custom code addition module 130, a correspondence establishment module 150 and a thematic knowledge point addition module 140.

The standardized code framework generation module 120 includes:

a reference standardized code generation unit 1201, configured to acquire a root node in the questioning and answering flowchart, generate a reference standardized code corresponding to the root node according to the type of the root node, and add the reference standardized code in an original code framework;

a currently traversed node acquisition unit 1202, configured to successively acquire, starting from a next layer of the root node, one node in the questioning and answering flowchart as a currently traversed node.

Typically, if there are multiple nodes in the next layer of the root node, in a certain traversal order, for example, from left to right or from right to left, all nodes in this layer are traversed, and nodes in the next layer are then traversed.

The standardized code framework generation module 120 also includes an additional standardized code acquisition unit 1203, configured to acquire, according to the type of the currently traversed node, an additional standardized code corresponding to the currently traversed node;

an additional standardized code addition unit 1204, configured to correspondingly add, according to the position of a standardized code of an upper-layer node connected to the currently traversed node via a connector in the original code framework, the additional standardized code in the original code framework;

a repetitive execution unit 1205, configured to trigger the currently traversed node code acquisition unit to continue the execution until all nodes in the questioning and answering flowchart are processed; and a standardized code framework determination unit 1206, configured to use the original code framework acquired after this processing as a standardized code framework matched with the questioning and answering flowchart.

It is to be noted that, in this embodiment of the present invention, a case in which a standardized code framework is generated according to the already drawn questioning and answering flowchart is provided. Actually, the standardized code framework may be updated and generated in real time during the drawing of the questioning and answering flowchart. In this embodiment, the time for generating the standardized code framework will not be limited.

In the technical solutions in this embodiment of the present invention, by generating a corresponding standardized code framework based on the already drawn questioning and answering flowchart, the defect of correspondingly updating the standardized code framework in response to the modification to the questioning and answering flowchart when the standardized code framework is generated during the drawing of the flowchart is avoided, and the efficiency of generating the questioning and answering flow module is improved.

An embodiment of the present invention provides a questioning and answering system, and the questioning and answering system is generated through a method for generating the questioning and answering system according to any one of embodiments of the present invention.

The questioning and answering system includes: a questioning and answering flow module corresponding to a questioning and answering flowchart, where the questioning and answering flowchart includes a plurality of graphic components, and the graphic components include at least one transaction node, where the transaction node is associated with a service interface executing a set type service; and a thematic knowledge point stored in the knowledge base, where the thematic knowledge point includes a thematic question and a thematic answer, the thematic question is used to indicate a trigger condition of the questioning and answering flow module matched with the questioning and answering system, and the thematic answer is used to establish a trigger relationship between the thematic knowledge point and the questioning and answering flow module.

Further, the questioning and answering flow module corresponding to the questioning and answering flowchart specifically includes:

a standardized code framework matched with the questioning and answering flowchart and generated according to each of the graphic components included in the questioning and answering flowchart; and a custom code added at a position associated with a graphic component in the standardized code framework and corresponding to each of the graphic components respectively, and generated according to custom configuration information matched with each of the graphic components in the questioning and answering flowchart.

The custom configuration information matched with the transaction node includes a service invocation address corresponding to the transaction node, and the service invocation address points to a service interface associated with the transaction node.

Further, the questioning and answering system also includes:

a knowledge point corresponding to a set transaction node in the questioning and answering flow module and stored in the knowledge base, where the knowledge point corresponding to the transaction node includes a transaction question and a transaction answer, and the transaction answer includes an associated transaction node, a type of at least one incoming parameter, a type of at least one missing parameter, and counter-question content matched with the type of the missing parameter;

the transaction question is used to match received user input information;

the type of the incoming parameter is used to match a type of a dynamic variable included in the user input information;

the type of the missing parameter and the counter-question content matched with the type of the missing parameter are used to determine counter-question content corresponding to the type of the missing parameter in the user input information; and the associated transaction node is used to determine a transaction node to which the dynamic variable contained in the user input information is input.

The technical solution of the embodiment of the present invention provides a questioning and answering system generated based on a method for generating the questioning and answering system. Through the questioning and answering system, a required questioning and answering flow module may be triggered conveniently and effectively according to questioning and answering needs, which greatly enriches knowledge point types stored in a knowledge base.

Figure 6:
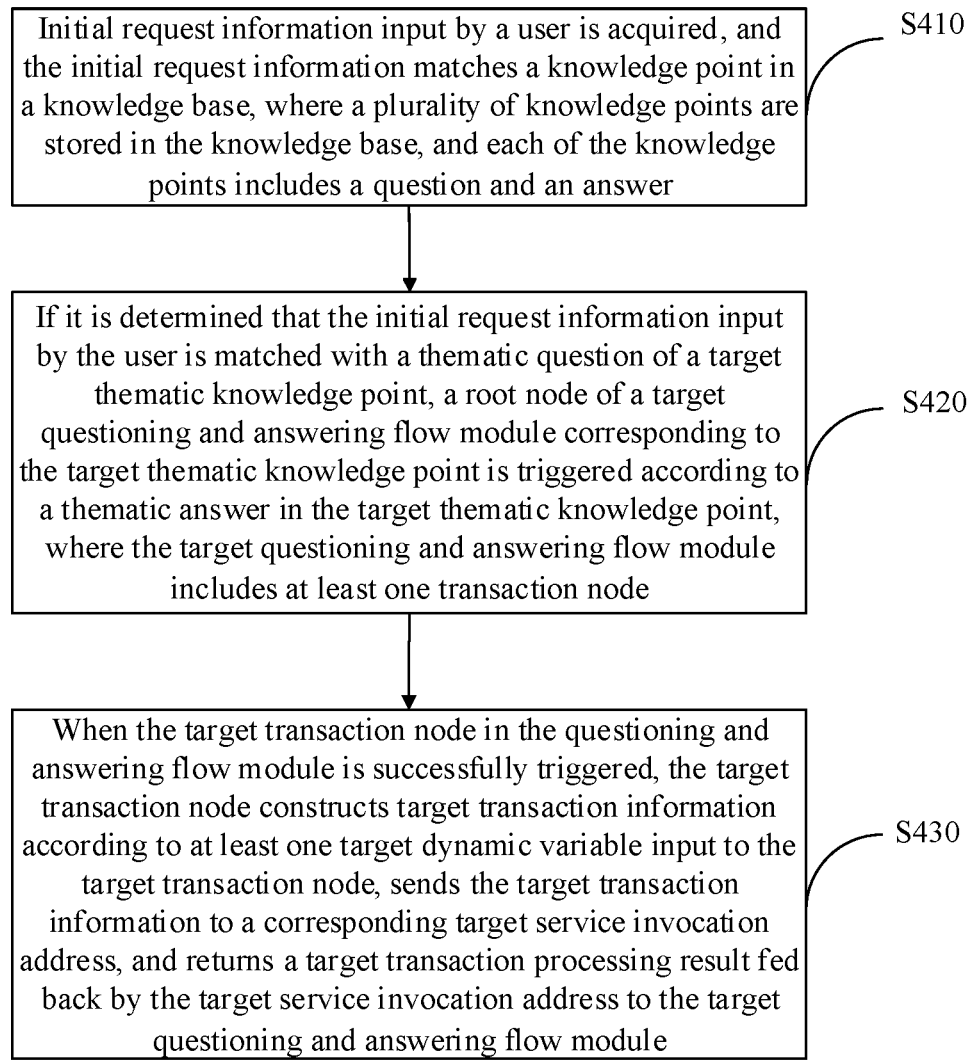
FIG. 6 is a flowchart of a questioning and answering method in an embodiment of the present invention.

FIG. 6 is a flowchart of a questioning and answering method in an embodiment of the present invention. A basis for the questioning and answering method in this embodiment is a questioning and answering system generated through the above method for generating the questioning and answering system. This embodiment is suitable for realizing questioning and answering interaction with an interactive user. The method may be implemented by a questioning and answering device based on the questioning and answering system. The device may be implemented by software and/or hardware, which may generally be integrated into a special apparatus (e.g., an intelligent robot) with an interaction function or a general terminal apparatus (e.g., a mobile phone, a tablet computer, etc.) installed with interactive software (e.g., voice assistant). The method specifically includes:

S410. Initial request information input by a user is acquired, and the initial request information matches a knowledge point in a knowledge base, where a plurality of knowledge points are stored in the knowledge base, and each of the knowledge points includes a question and an answer.

In this embodiment, the knowledge points stored in the knowledge base include: a questioning and answering knowledge point, a thematic knowledge point, a knowledge point corresponding to a transaction node (i.e., a transaction knowledge point), and a knowledge point corresponding to an interaction node (i.e., an interaction knowledge point). The related concept of the above knowledge points have been described in detail above, which will not be repeated herein.

S420. If it is determined that the initial request information input by the user is matched with a thematic question of a target thematic knowledge point, a root node of a target questioning and answering flow module corresponding to the target thematic knowledge point is triggered according to a thematic answer in the target thematic knowledge point, where the target questioning and answering flow module includes at least one transaction node.

In this embodiment, information capable of accurately positioning the corresponding questioning and answering flow module is stored in the thematic answer in the thematic knowledge point. After it is determined that the initial request information input by the interactive user is matched with a thematic question in a thematic knowledge point, the matched questioning and answering flow module can be accurately positioned, and a root node of this questioning and answering flow module is correspondingly triggered, that is, the questioning and answering flow module is activated to perform questioning and answering interaction with the interactive user.

It is to be emphasized that, for root nodes of different types (for example, a transaction node, an interaction node or a broadcast node), the concept of the trigger is different. For example, for one broadcast node, if the broadcast node is triggered, the preset broadcast content will be directly broadcast to the user, and the questioning and answering flow module is proceeded to a next node which is connected to the broadcast node via a connector, to continue the execution; while for an interaction node, if this interaction node is triggered, the preset broadcast content will be directly broadcast to the user, and a search operation will be performed in the knowledge base according to the interaction information fed back by the user so as to determine a next proceeding trend for the questioning and answering flow module.

Unlike the above both, for a transaction node, if this transaction node is triggered, the process will stay on this transaction node to re-acquire the user input information. Only when it is determined that all dynamic variables required to construct transaction information can be acquired from the user input information, the transaction node can be successfully triggered, the transaction information is transmitted to an associated service interface, and a transaction processing result returned by the service interface is fed back to the questioning and answering flow module. In other words, there are two states for a transaction node, i.e., a triggered state and a successfully triggered state. In the triggered state, the user input information is acquired, and a transaction processing result is constructed according to the user input information; and, in the successfully triggered state, the transaction processing result is transmitted to an associated service interface.

S430. When the target transaction node in the questioning and answering flow module is successfully triggered, the target transaction node constructs target transaction information according to at least one target dynamic variable input to the target transaction node, sends the target transaction information to a corresponding target service invocation address, and returns a target transaction processing result fed back by the target service invocation address to the target questioning and answering flow module, so that the target questioning and answering flow module performs further execution according to the target transaction processing result.

As mentioned above, the questioning and answering flow module includes at least one transaction node, and the transaction node is associated with a service interface executing a set type of services. The service interface is configured to acquire the corresponding transaction processing result according to one or more pieces of transaction information input to this interface. If it is intended to ensure that the service interface can normally return the desired transaction processing result, it must be ensured that the number and type of transaction information input to the service interface are consistent with the input content defined by the service interface.

Correspondingly, a target transaction node in the questioning and answering flow module being successfully triggered specifically means that, when the questioning and answering flow module is proceeded the target transaction node, and if the target transaction node can construct the transaction information required by the service node according to the number and type of the dynamic variables acquired from the user input information or the upstream nodes, this transaction node is successfully triggered.

In a specific example, if it is assumed that the initial request information input by the user is "I want to inquire available meeting rooms", by matching the initial request information with a knowledge base and determining to activate a questioning and answering flow module corresponding to the flowchart shown in FIG. 1a, a meeting room inquiry node 101 will be triggered first, and the meeting rood inquiry node 101 will continue to extract the required dynamic variables according to the user input information, for example, the time XX, the number XX of participants and the meeting room of XX type. When it is determined that the transaction information required by the associated service interface can be constructed by the dynamic variables, the meeting room inquiry node 101 will be successfully activated, the transaction information will be transmitted to the associated service interface, and the number of meeting rooms satisfying the condition, which is returned by the service interface, is provided to the questioning and answering flow module so that a next proceeding trend for the questioning and answering flow module is determined.

Figure 7:
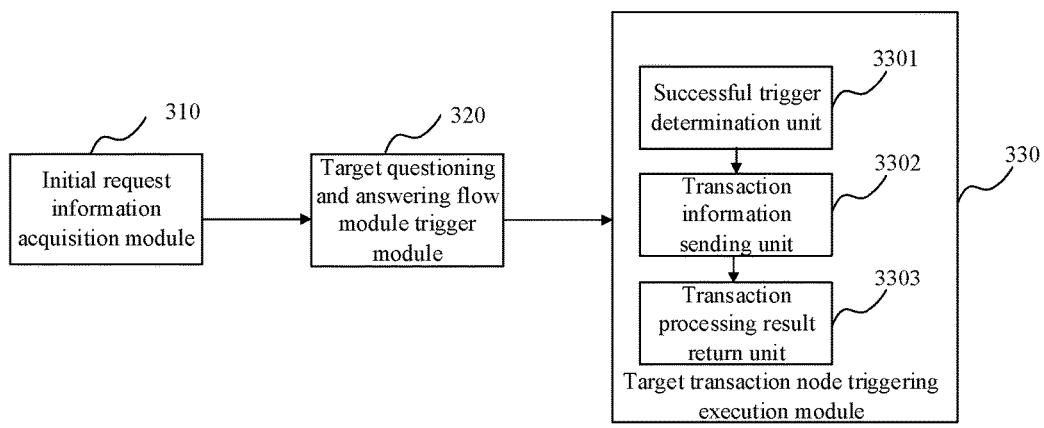
FIG. 7 is a structural diagram of a questioning and answering device in an embodiment of the present invention.

The embodiment of the present invention further provides a questioning and answering device based on a questioning and answering system. As shown in FIG. 7, the device specifically includes: an initial request information acquisition module 310, a target questioning and answering flow module triggering module 320, and a target transaction node triggering execution module 330.

The initial request information acquisition module 310 is configured to acquire initial request information input by a user, and match a knowledge point in a knowledge base with the initial request information, where a plurality of knowledge points are stored in the knowledge base, and each of the knowledge points includes a question and an answer.

The target questioning and answering flow module trigger module 320 is configured to, if it is determined that the initial request information input by the user is matched with a thematic question of a target thematic knowledge point, trigger a root node of a target questioning and answering flow module corresponding to the target thematic knowledge point according to a thematic answer in the target thematic knowledge point, where the target questioning and answering flow module includes at least one transaction node.

The target transaction node trigger and execution module 330 includes:

a successful trigger determination unit 3301, configured to determine that a target transaction node in the questioning and answering flow module is successfully triggered;

a transaction information sending unit 3302, configured to, when the target transaction node in the questioning and answering flow module is successfully triggered, construct target transaction information according to at least one target dynamic variable input to the target transaction node, and send the target transaction information to a corresponding target service invocation address; and a transaction processing result return unit 3303, configured to return a target transaction processing result fed back by the target service invocation address to the target questioning and answering flow module, so that the target questioning and answering flow module performs further execution according to the target transaction processing result.

An embodiment of the present invention provides a questioning and answering method and device based on a questioning and answering system. Based on a technical measure of acquiring initial request information input by a user, and matching a knowledge point in a knowledge base with the initial request information; if it is determined that the initial request information input by the user is matched with a thematic question in a target thematic knowledge point, triggering a root node of a target questioning and answering flow module corresponding to the target thematic knowledge point according to a thematic answer in the target thematic knowledge point; and when the target transaction node in the questioning and answering flow module is triggered, constructing, by the target transaction node, target transaction information according to at least one target dynamic variable input to the target transaction node, sending, by the target transaction node, the target transaction information to a corresponding target service invocation address, and returning a target transaction processing result fed back by the target service invocation address to the target questioning and answering flow module, a specific implementation manner that a questioning and answering system including a transaction node interacts with a user is provided, which greatly satisfies user's demands for questioning and answering and improves efficiency and accuracy of questioning and answering interaction.

Figure 8:
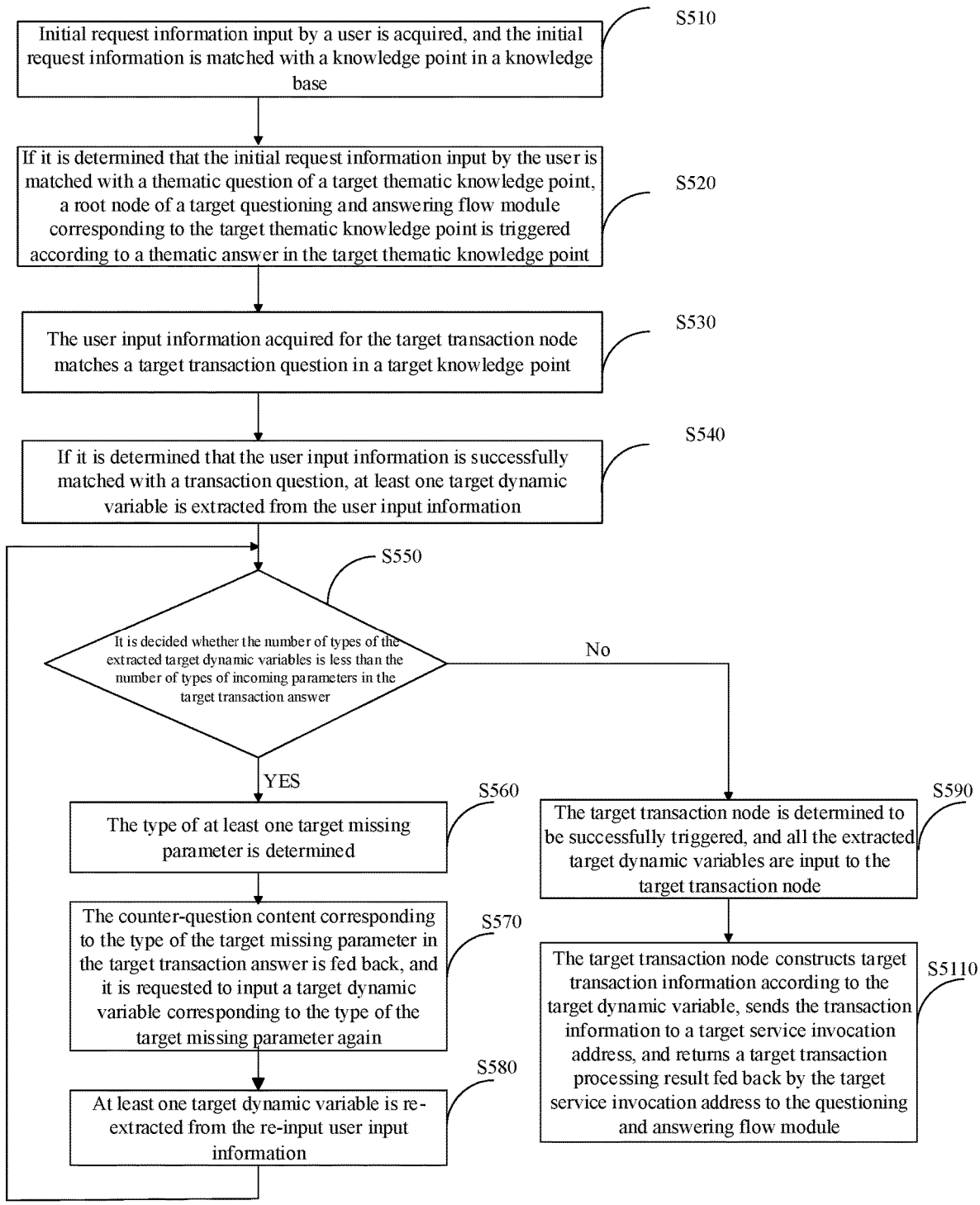
FIG. 8 is a flowchart of another questioning and answering method in an embodiment of the present invention.

FIG. 8 is a flowchart of a questioning and answering method based on a questioning and answering system in an embodiment of the present invention. This present embodiment is optimized based on the above embodiment. In this embodiment, the operation of successfully triggering a target transaction node in the questioning and answering flow module is subdivided. Correspondingly, the method in this embodiment specifically includes the following steps.

S510. Initial request information input by a user is acquired, and the initial request information is matched with a knowledge point in a knowledge base, where a plurality of knowledge points are stored in the knowledge base, and each of the knowledge points includes a question and an answer.

S520. If it is determined that the initial request information input by the user is matched with a thematic question of a target thematic knowledge point, a root node of a target questioning and answering flow module corresponding to the target thematic knowledge point is triggered according to a thematic answer in the target thematic knowledge point, where the target questioning and answering flow module includes at least one transaction node.

S530. The user input information acquired for the target transaction node matches a target transaction question in a target knowledge point.

In this embodiment, when the target questioning and answering flow module is proceeded to the target transaction node, the target transaction node is triggered.

The target transaction node corresponds to a first knowledge point in the knowledge base, and the target knowledge point includes a target transaction question and a target transaction answer.

In this embodiment, the first knowledge point is a transaction knowledge point. The transaction answer includes an associated transaction node, a type of at least one incoming parameter, a type of at least one missing parameter, and counter-question content matched with the type of the missing parameter.

The transaction question is used to match the received user input information.

The type of the incoming parameter is used to match a type of a dynamic variable included in the user input information; the type of the missing parameter and the counter-question content matched with the type of the missing parameter are used to determine counter-question content corresponding to the type of the missing parameter in the user input information; and the associated transaction node is used to determine a transaction node to which the dynamic variable contained in the user input information is input.

S540. If it is determined that the user input information is successfully matched with a transaction question, at least one target dynamic variable is extracted from the user input information.

In this embodiment, if it is determined that the user input information is successfully matched with a transaction question, at least one target dynamic variable can be extracted from the user input information; however, if it is determined that the user input information is not matched with a transaction question, the user input information can be requested to be input again by feedback.

S550. It is decided whether the number of types of the extracted target dynamic variables is less than the number of types of incoming parameters in the target transaction answer; if so, S560 is executed; if not, S590 is executed.

The deciding whether the number of types of the extracted target dynamic variables is less than the number of types of incoming parameters in the target transaction answer specifically means deciding whether the types of the target extracted dynamic variables is consistent with the types of incoming parameters in the target transaction answer and whether the types of the acquired target dynamic variables can cover all types of incoming parameters. For example, as shown in Table 2, the types of the incoming parameters contained in the transaction answer include the meeting time, the number of meeting participants and the type of meeting.

S560. The type of at least one target missing parameter is determined, and S570 is executed.

S570. The counter-question content corresponding to the type of the target missing parameter in the target transaction answer is fed back, and it is requested to input a target dynamic variable corresponding to the type of the target missing parameter again.

S580. At least one target dynamic variable is re-extracted from the re-input user input information, and the process returns to S550.

S590. The target transaction node is determined to be successfully triggered, and all the extracted target dynamic variables are input to the target transaction node.

S5100. The target transaction node constructs target transaction information according to at least one target dynamic variable input to the target transaction node, sends the target transaction information to a corresponding target service invocation address, and returns a target transaction processing result fed back by the target service invocation address to the questioning and answering flow module so that the questioning and answering flow module continues the execution according to the target transaction processing result.

Figure 9:
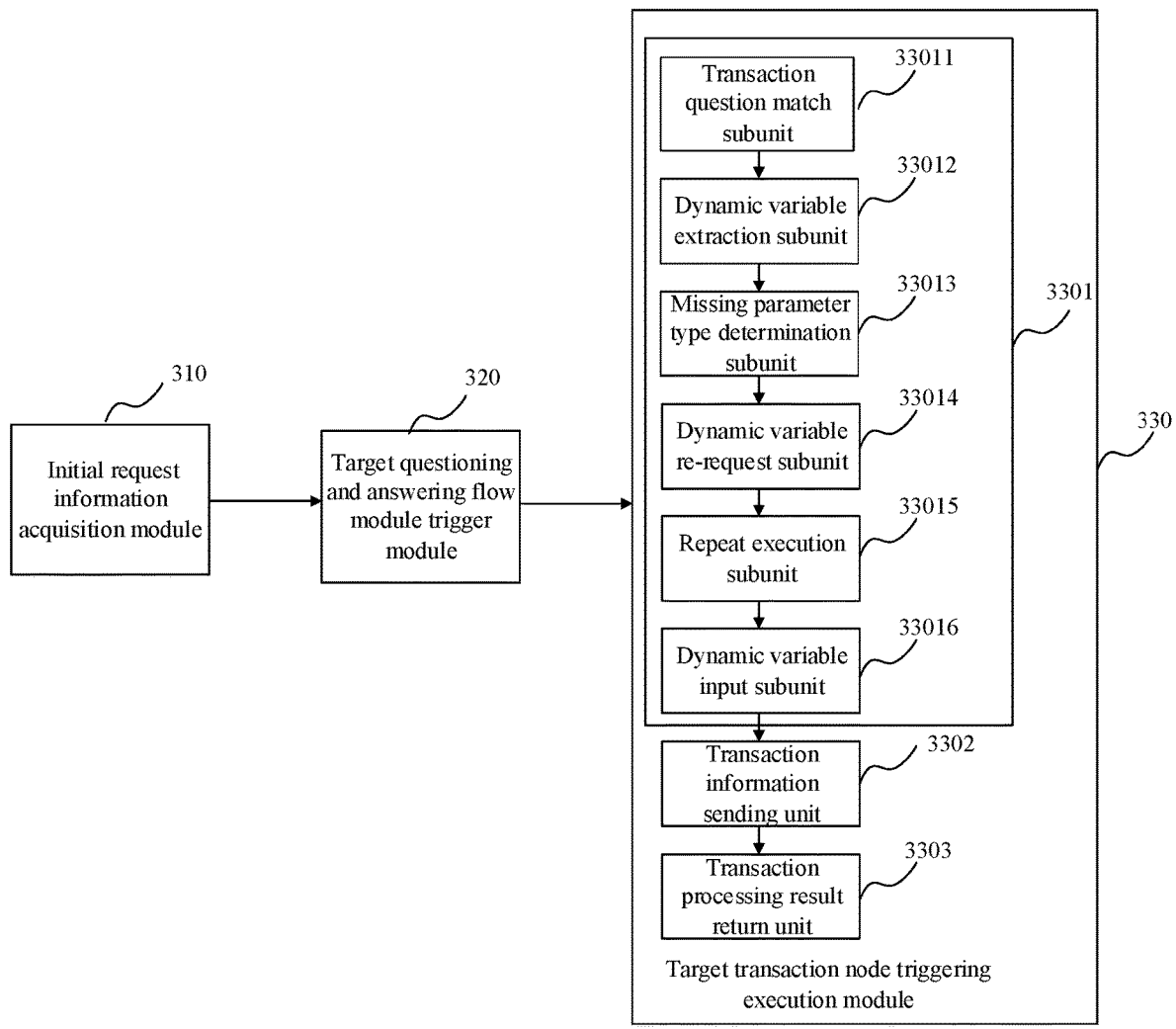
FIG. 9 is a structural diagram of another questioning and answering device in an embodiment of the present invention.

FIG. 9 is a structural diagram of a questioning and answering device based on a questioning and answering system in an embodiment of the present invention. This embodiment is optimized based on the above embodiment. In this embodiment, the successful trigger determination unit is subdivided. Correspondingly, the device in this embodiment specifically includes: an initial request information acquisition module 310, a target questioning and answering flow module triggering module 320, and a target transaction node triggering execution module 330.

The initial request information acquisition module 310 is configured to acquire initial request information input by a user, and match a knowledge point in a knowledge base with the initial request information, where a plurality of knowledge points are stored in the knowledge base, and each of the knowledge points includes a question and an answer.

The target questioning and answering flow module trigger module 320 is configured to, if it is determined that the initial request information input by the user is matched with a thematic question of a target thematic knowledge point, trigger a root node of a target questioning and answering flow module corresponding to the target thematic knowledge point according to a thematic answer in the target thematic knowledge point, where the target questioning and answering flow module includes at least one transaction node.

The target transaction node triggering execution module 330 includes:

A successful trigger determination unit 3301, configured to determine that a target transaction node in the questioning and answering flow module is successfully triggered.

The successful trigger determination unit 3301 further includes that in this embodiment, when the target questioning and answering flow module is proceeded to the target transaction node, the target transaction node is triggered.

The target transaction node corresponds to a first knowledge point in the knowledge base, and the target knowledge point includes a target transaction question and a target transaction answer.

In this embodiment, the first knowledge point is a transaction knowledge point. The transaction answer includes an associated transaction node, a type of at least one incoming parameter, a type of at least one missing parameter, and counter-question content matched with the type of the missing parameter.

The transaction question is used to match received user input information.

The type of the incoming parameter is used to match a type of a dynamic variable included in the user input information; the type of the missing parameter and the counter-question content matched with the type of the missing parameter are used to determine counter-question content corresponding to the type of the missing parameter in the user input information; and the associated transaction node is used to determine a transaction node to which the dynamic variable contained in the user input information is input.

A dynamic variable extraction subunit 33012, configured to extract at least one target dynamic variable from the user input information if it is determined that the user input information is successfully matched with a transaction question.

In this embodiment, if it is determined that the user input information is successfully matched with a transaction question, at least one target dynamic variable can be extracted from the user input information; however, if it is determined that the user input information is not matched with a transaction question, the user input information can be requested to be input again by feedback.

A missing parameter type determination subunit 33013, configured to determine a type of at least one target missing parameter if it is determined that a number of types of the extracted target dynamic variables is less than a number of types of incoming parameters in the target transaction answer.

The deciding whether the number of types of the extracted target dynamic variables is less than the number of types of incoming parameters in the target transaction answer specifically means deciding whether the type of the target extracted dynamic variables is consistent with the type of incoming parameters in the target transaction answer and whether the type of the acquired target dynamic variables can cover all types of incoming parameters. For example, as shown in Table 2, the type of the incoming parameters contained in the transaction answer is the meeting time, the number of meeting participants and the type of meeting.

A dynamic variable re-request subunit 33014, configured to feed back counter-question content corresponding to the type of the target missing parameter in the target transaction answer, and request re-inputting a target dynamic variable corresponding to the type of the target missing parameter.

A repeat execution subunit 33015, configured to re-extract the at least one target dynamic variable from re-input user input information, and re-trigger the missing parameter type determination subunit to perform execution, until target dynamic variables corresponding to types of all incoming parameters in the target transaction answer are completely extracted.

A dynamic variable input subunit 33016, configured to determine that the target transaction node is successfully triggered and input all of the extracted target dynamic variables to the target transaction node.

A transaction information sending unit 3302, configured to, when the target transaction node in the questioning and answering flow module is successfully triggered, construct target transaction information according to at least one target dynamic variable input to the target transaction node, and send the target transaction information to a corresponding target service invocation address.

A transaction processing result return unit 3303, configured to return a target transaction processing result fed back by the target service invocation address to the target questioning and answering flow module, so that the target questioning and answering flow module performs further execution according to the target transaction processing result.

According to the technical solutions in this embodiment of the present invention, by establishing a correspondence between a transaction node and a transaction knowledge point in a knowledge base and defining, in this transaction knowledge point, counter-question content when the user input information does not include one or more dynamic variables required by the transaction node, different counter-question content can be fed back according to different user input information when the finally constructed questioning and answering system is controlled to proceed to a transaction node matched with the transaction knowledge point, so that the user can correct the content input by the user according to the counter-question content. Only the missing dynamic variables are required to be offered again, and it is unnecessary to provide the dynamic variables that have already been offered. The transaction node can be triggered and work normally, and meanwhile, requirements for user input information are greatly reduced, and questioning and answering efficiency of the questioning and answering system and user experience can be significantly improved.

Based on the above embodiments, the process of constructing, by the target transaction node, target transaction information according to at least one target dynamic variable input to the target transaction node and then transmitting the target transaction information to a corresponding service invocation address may include:

constructing, by the target transaction node, target transaction information according to at least one target dynamic variable input to the target transaction node and an incoming parameter definition item corresponding to the target transaction node, and sending, by the target transaction node, the target transaction information to the target service invocation address matched with the target transaction node.

The transaction information sending unit is specifically configured to:

construct, by the target transaction node, target transaction information according to at least one target dynamic variable input to the target transaction node and an incoming parameter definition item corresponding to the target transaction node, and send, by the target transaction node, the target transaction information to the target service invocation address matched with the target transaction node.

The incoming parameter definition item includes at least one incoming parameter name and an incoming parameter variable matched with the incoming parameter name, the incoming parameter name is a parameter name capable of being recognized by a service interface associated with the target transaction node, and the incoming parameter variable matches the target dynamic variable input to the target transaction node.

Specifically, referring to FIGS. 1b and 1c, the user input information acquired by the transaction node (i.e., the meeting room inquiry node 101) is "the meeting is from 9:00 am to 11:00 am". By matching the user input information with a transaction knowledge point corresponding to the meeting room inquiry node 101 in the knowledge base, the acquired dynamic variables are as follows: the startime of the meeting=9:00 am, and the overtime of the meeting=11:00 am. The transaction node constructs transaction information (i.e., startime=9:00 am and overtime=11:00 am, which are variable forms capable of being recognized by a service interface for meeting room inquiry) by using the dynamical variables (i.e., the startime of the meeting=9:00 am and the overtime of the meeting=11:00 am). Subsequently, the transaction node transmits the transaction information to a service invocation address (i.e., http://voadev.sh.xaioi.com) corresponding to the service interface and the transaction node can receive a result of meeting room inquiry returned by the service invocation address.

Based on the above embodiments, the returning a target transaction processing result fed back by the target service invocation address to the target questioning and answering c module, so that the target questioning and answering invocation module performs further execution according to the target transaction processing result may include:

determining a target downstream connector matched with the target transaction processing result according to the target transaction processing result and target dynamic condition configuration information of each of the downstream connectors, if it is determined that the target transaction node is associated with at least two downstream connectors; and controlling the target questioning and answering flow module to proceed to a target downstream node connected to the target downstream connector to perform further execution;

wherein the target dynamic condition configuration information includes an outputting parameter definition item and a condition set value, where the outputting parameter definition item matches at least one target transaction processing result received by the target transaction node, and the condition set value is used for conditional comparison with the target transaction processing result in the outputting parameter definition item.

Based on the above embodiments, the controlling the target questioning and answering flow module to proceed to a target downstream node connected to the target downstream connector to perform further execution includes:

broadcasting, according to broadcast content matched with a target transaction processing result and set by the target downstream node, to the user, wherein the broadcast content includes the target transaction processing result, a combination of the target transaction processing result and preset information, or a combination of the target transaction processing result and a target dynamic variable input to the target transaction node.

The target downstream node includes an interaction node, a broadcast node, or another transaction node.

Figure 10:
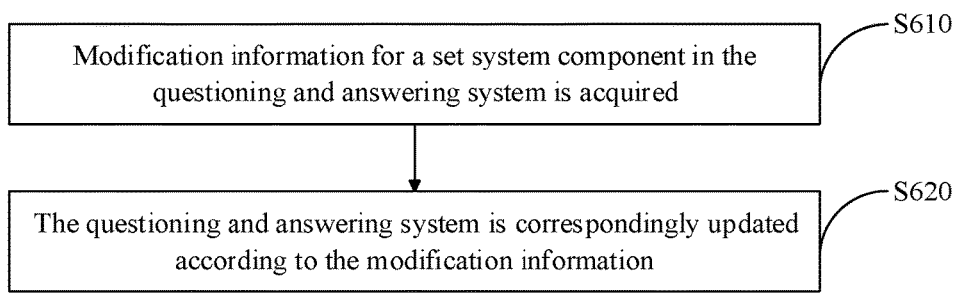
FIG. 10 is a flowchart of a method for modifying a questioning and answering system in an embodiment of the present invention.

FIG. 10 is a flowchart of a method for modifying a questioning and answering system in an embodiment of the present invention. The basis of the modification method in this embodiment is the above questioning and answering system. This embodiment is suitable for modifying the already successfully generated questioning and answering system. The method may be realized by a device for modifying the questioning and answering system. The device may be implemented by software and/or hardware, which can generally be integrated into a terminal apparatus or server for modifying the questioning and answering system. The terminal apparatus or server is directly or indirectly connected to a knowledge base.

The questioning and answering system also includes:

a questioning and answering flow module corresponding to a questioning and answering flowchart, where the questioning and answering flowchart includes a plurality of graphic components, and the graphic components include at least one transaction node, where the transaction node is associated with a service interface executing a set type service; and a thematic knowledge point stored in the knowledge base, where the thematic knowledge point includes a thematic question and a thematic answer, the thematic question is used to indicate a trigger condition of the questioning and answering flow module matched with the questioning and answering system, and the thematic answer is used to establish a trigger relationship between the thematic knowledge point and the questioning and answering flow module.

Further, the questioning and answering system also includes:

a knowledge point corresponding to a set transaction node in the questioning and answering flow module and stored in the knowledge base, where the knowledge point corresponding to the transaction node includes a transaction question and a transaction answer, and the transaction answer includes an associated transaction node, a type of at least one incoming parameter, a type of at least one missing parameter, and counter-question content matched with the type of the missing parameter;

the transaction question is used to match received user input information;

the type of the incoming parameter is used to match a type of a dynamic variable included in the user input information; the type of the missing parameter and the counter-question content matched with the type of the missing parameter are used to determine counter-question content corresponding to the type of the missing parameter in the user input information; and the associated transaction node is used to determine a transaction node to which the dynamic variable contained in the user input information is input.

The method for modifying a questioning and answering system specifically includes the following steps.

S610. Modification information for a set system component in the questioning and answering system is acquired.

In this embodiment, the system component may include: a thematic knowledge point corresponding to the questioning and answering system and the questioning and answering flow module corresponding to the questioning and answering system.

The modification information includes any one or any combination: modifying the thematic knowledge point corresponding to the questioning and answering system, and modifying the questioning and answering flow module corresponding to the questioning and answering system.

S620. The questioning and answering system is correspondingly updated according to the modification information.

For example, if the modification information is to adjust the thematic knowledge point corresponding to the questioning and answering system, the thematic knowledge point in the knowledge base may be updated correspondingly according to modified thematic question and/or thematic answer; if the modification content is to delete the thematic knowledge point corresponding to the questioning and answering system, the thematic knowledge point is directly deleted in the knowledge base.

Figure 11:
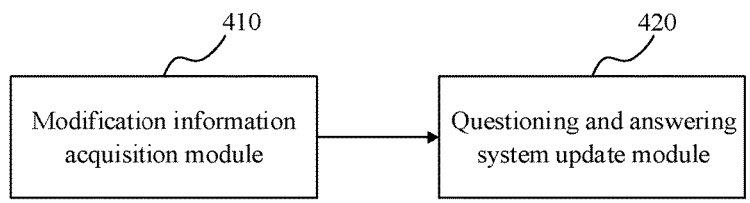
FIG. 11 is a structural diagram of a device for modifying a questioning and answering system in one embodiment of the present invention.

An embodiment of the present invention further provides a device for modifying a questioning and answering system, as shown in FIG. 11, including:

a modification information acquisition module 410, configured to acquire modification information for set system components in the questioning and answering system.

In this embodiment, the system component may include: a thematic knowledge point corresponding to the questioning and answering system and the questioning and answering flow module corresponding to the questioning and answering system. The modification information includes any one or any combination of: modifying the thematic knowledge point corresponding to the questioning and answering system, and modifying the questioning and answering flow module corresponding to the questioning and answering system.

The device further includes a questioning and answering system update module 420, configured to correspondingly update the questioning and answering system according to the modification information.

For example, if the modification information is to adjust the thematic knowledge point corresponding to the questioning and answering system, the thematic knowledge point in the knowledge base may be updated correspondingly according to modified thematic question and/or thematic answer; if the modification content is to delete the thematic knowledge point corresponding to the questioning and answering system, the thematic knowledge point is directly deleted in the knowledge base.

The embodiment of the present invention provides a method for modifying a questioning and answering system and a device for modifying the questioning and answering system. Based on the technical scheme of acquiring modification information for a set system component in the questioning and answering system, where the modification information includes any one or any combination of: modifying a thematic knowledge point corresponding to the questioning and answering system, and modifying a target questioning and answering flow module corresponding to the questioning and answering system; and correspondingly updating the questioning and answering system according to the modification information, a specific manner for modifying the questioning and answering system is provided, which greatly satisfies the user's requirements to modify the questioning and answering system, optimizes existing methods of modifying the questioning and answering system, improves efficiency and convenience of modifying the questioning and answering, implements rapid modification and update of the questioning and answering system, avoids introduction of developers in the process of modifying the questioning and answering system, and greatly reduces workload of the developers.

Figure 12:
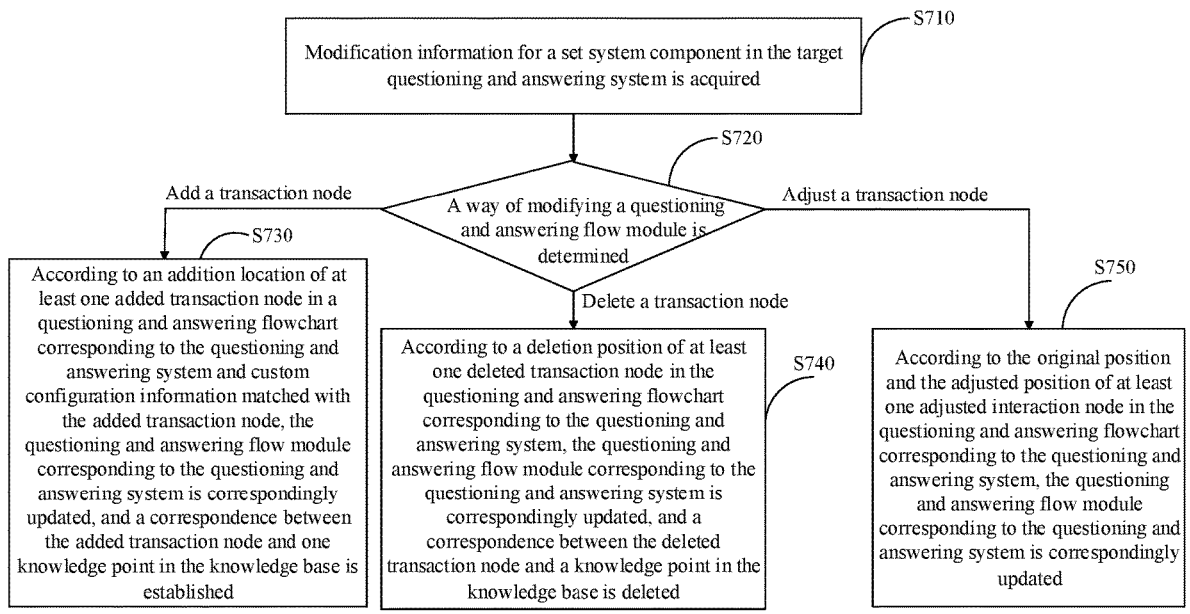
FIG. 12 is a flowchart of another method for modifying a questioning and answering system in an embodiment of the present invention.

FIG. 12 is a flowchart of a method for modifying a questioning and answering system in an embodiment of the present invention. This present embodiment is optimized based on the above embodiment. In this embodiment, the operation of updating the questioning and answering system when the modification content is modification to a questioning and answering flow module corresponding to a questioning and question answering system is further subdivided. Correspondingly, the method in this embodiment of the present invention includes the following steps.

S710. Modification information for a set system component in the target questioning and answering system is acquired.

The modification information specifically includes modifying a target questioning and answering flow module corresponding to the target questioning and answering system. Specifically, the modifying a target questioning and answering flow module corresponding to the questioning and answering system may include: adding, deleting, and/or adjusting a transaction node of the target questioning and answering flow module.

Generally, the flow designer is not a developer, so he/she is unable to directly complete the modification to a questioning and answering flow module (i.e., implementation codes). Correspondingly, a correspondence between a questioning and answering flowchart and a target questioning and answering flow module can be established in advance, and the modification to the questioning and answering flow module is correspondingly acquired by acquiring the modification to the questioning and answering flowchart.

S720. A way of modifying a questioning and answering flow module is determined: if it is to add an interaction node, S730 is executed; if it is to delete an interaction node, S740 is executed; and if it is to adjust an interaction node, S750 is executed.

S730. According to an addition location of at least one added transaction node in a questioning and answering flowchart corresponding to the questioning and answering system and custom configuration information matched with the added transaction node, the questioning and answering flow module corresponding to the questioning and answering system is correspondingly updated, and a correspondence between the added transaction node and one knowledge point in the knowledge base is established.

S740. According to a deletion position of at least one deleted transaction node in the questioning and answering flowchart corresponding to the questioning and answering system, the questioning and answering flow module corresponding to the questioning and answering system is correspondingly updated, and a correspondence between the deleted transaction node and a knowledge point in the knowledge base is deleted.

In an optional implementation of this embodiment, the step of deleting a correspondence between the deleted transaction node and a knowledge point in the knowledge base may include: searching, in the knowledge base, a knowledge point corresponding to the deleted node and determining the knowledge point as a to-be-deleted knowledge point; if it is determined that the to-be-deleted knowledge point corresponds to only the deleted transaction node, deleting the to-be-deleted knowledge point from the knowledge base, and deleting the correspondence between the deleted transaction node and the to-be-deleted knowledge point; and if it is determined that the to-be-deleted knowledge point corresponds to another transaction node besides the deleted transaction node, retaining the to-be-deleted knowledge point in the knowledge base, and deleting only the correspondence between the deleted transaction node and the to-be-deleted knowledge point.

S750. According to the original position and the adjusted position of at least one adjusted interaction node in the questioning and answering flowchart corresponding to the questioning and answering system, the questioning and answering flow module corresponding to the questioning and answering system is correspondingly updated.

Figure 13:
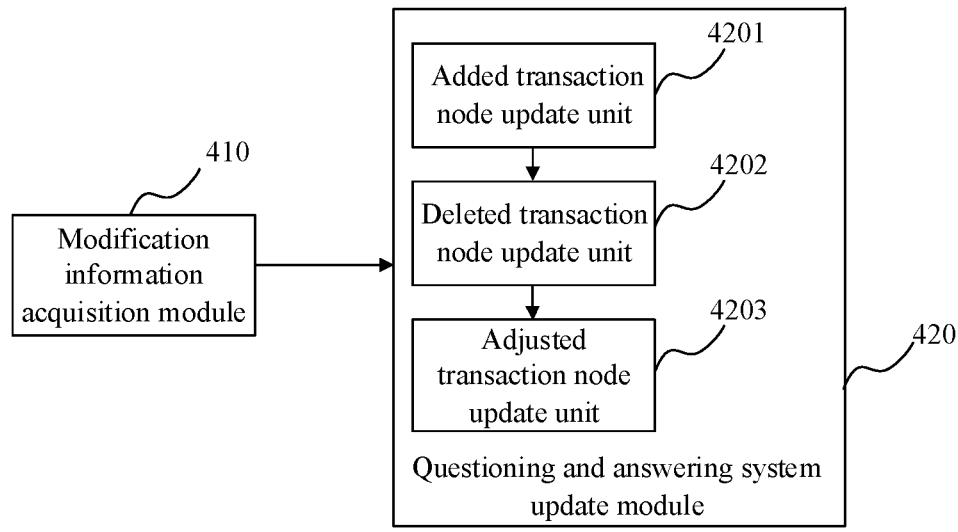
FIG. 13 is a structural diagram of another device for modifying a questioning and answering system in one embodiment of the present invention.

An embodiment of the present invention further provides a device for modifying a questioning and answering system, as shown in FIG. 13. This present embodiment is optimized based on the above embodiment. In this embodiment, a questioning and answering system update module is further subdivided. Correspondingly, the device in this embodiment of the present invention includes a modification information acquisition module 410 and a questioning and answering system update module 420.

The modification information acquisition module 410 is configured to acquire modification information for set system components in the questioning and answering system.

The modification information specifically includes modifying a target questioning and answering flow module corresponding to the target questioning and answering system.

Specifically, the modifying a target questioning and answering flow module corresponding to the questioning and answering system may include: adding, deleting, and/or adjusting a transaction node of the target questioning and answering flow module.

Generally, the flow designer is not a developer, so he/she is unable to directly complete the modification to a questioning and answering flow module (i.e., implementation codes). Correspondingly, a correspondence between a questioning and answering flowchart and a target questioning and answering flow module can be established in advance, and the modification to the questioning and answering flow module is correspondingly acquired by acquiring the modification to the questioning and answering flowchart.

The questioning and answering system update module 420 is configured to correspondingly update the questioning and answering system according to the modification information.

The questioning and answering system update module 420 may specifically include:

an added transaction node update unit 4201 configured to, according to an addition location of at least one added transaction node in a questioning and answering flowchart corresponding to the questioning and answering system and custom configuration information matched with the added transaction node, correspondingly update a questioning and answering flow module corresponding to the questioning and answering system, and establish a correspondence between the added transaction node and one knowledge point in the knowledge base;

a deleted transaction node update unit 4202 configured to, according to a deleted position of at least one deleted transaction node in the questioning and answering flowchart corresponding to the questioning and answering system, correspondingly update the questioning and answering flow module corresponding to the questioning and answering system, and delete a correspondence between the deleted transaction node and one knowledge point in the knowledge base; and an adjusted transaction node update unit 4203 configured to, according to an original position and an adjusted position of at least one adjusted transaction node in the questioning and answering flowchart corresponding to the questioning and answering system, correspondingly update the questioning and answering flow module corresponding to the questioning and answering system.

The deleted transaction node update unit 4202 may further include:

a to-be-deleted knowledge point search subunit configured to search, in the knowledge base, one knowledge point corresponding to the deleted node as a to-be-deleted knowledge point;

a first to-be-deleted knowledge point processing unit configured to, if it is determined that the to-be-deleted knowledge point corresponds to only the deleted transaction node, delete the to-be-deleted knowledge point from the knowledge base, and delete the correspondence between the deleted transaction node and the to-be-deleted knowledge point; and a second to-be-deleted knowledge point processing unit configured to, if it is determined that the to-be-deleted knowledge point corresponds to another transaction node besides the deleted transaction node, retain the to-be-deleted knowledge point in the knowledge base, and delete only the correspondence between the deleted transaction node and the to-be-deleted knowledge point.

By the technical solutions in this embodiment of the present invention, a method for updating a questioning and answering system and a device when a questioning and answering flow module corresponding to the questioning and answering system is modified are provided, so that the flow designer can conveniently realize the modification to the questioning and answering flow module, even he/she is not good at code writing. The workload of the developers is minimized.

Based on the above embodiments, the modifying the questioning and answering flow module corresponding to the questioning and answering system includes: adding, deleting and/or adjusting broadcast nodes and/or connectors of the questioning and answering flow module.

The updating the questioning and answering system according to the modification information may correspondingly include:

correspondingly updating, according to an addition location of at least one added broadcast node and/or added connector in a questioning and answering flowchart corresponding to the questioning and answering system and custom configuration information matched with the added broadcast node and/or added connector, a questioning and answering flow module corresponding to the questioning and answering system;

correspondingly updating, according to a deleted position of at least one deleted broadcast node and/or deleted connector in the questioning and answering flowchart corresponding to the questioning and answering system, the questioning and answering flow module corresponding to the questioning and answering system; and correspondingly updating, according to an original position and an adjusted position of at least one adjusted broadcast node and/or adjusted connector in the questioning and answering flowchart corresponding to the questioning and answering system, the questioning and answering flow module corresponding to the questioning and answering system.

In this way, another method for updating the questioning and answering system when the questioning and answering flow module corresponding to the questioning and answering system is modified is provided, so that the flow designer can conveniently implement the modification to the questioning and answering flow module, even he/she is not good at code writing. The workload of the developers is minimized.

Figure 14:
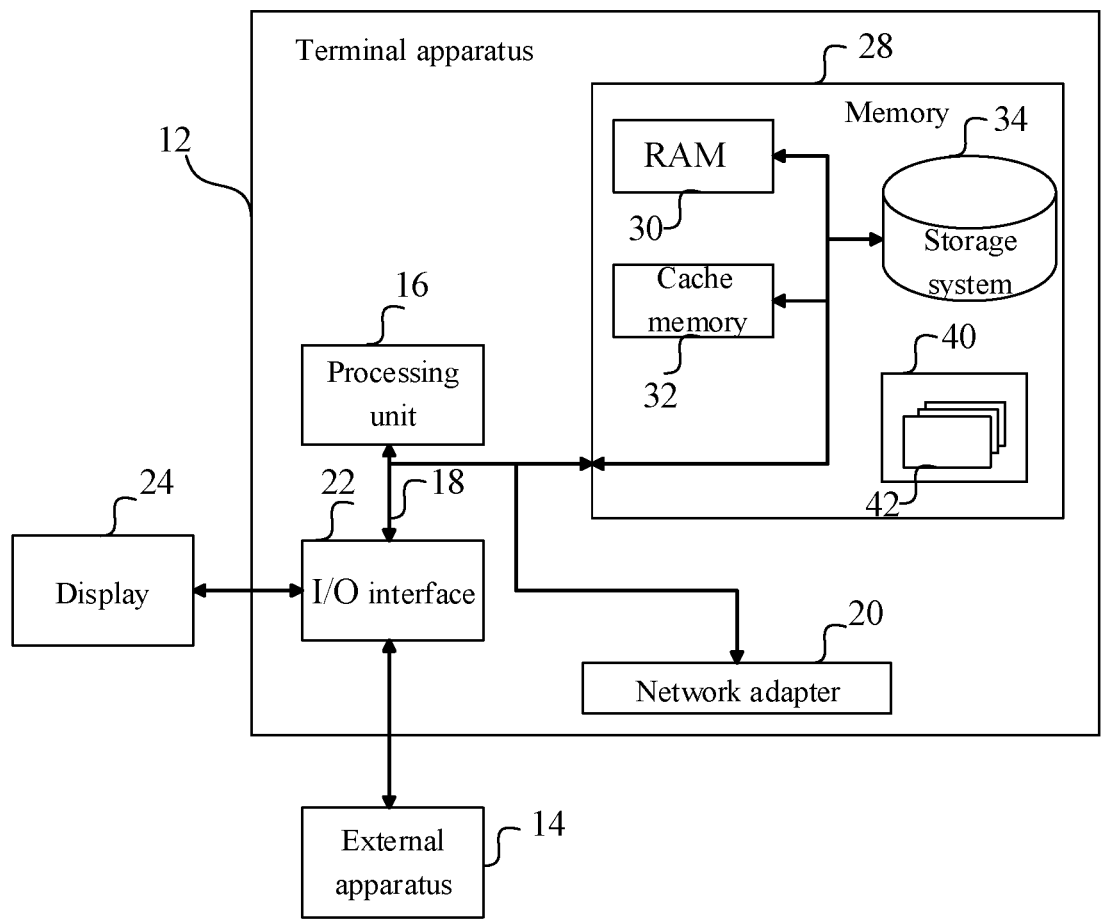
FIG. 14 is a schematic structural diagram of a terminal apparatus.

FIG. 14 is a schematic structure diagram of a computer apparatus according to an embodiment of the present invention. FIG. 14 shows a block diagram of an exemplary computer apparatus 12 used to perform the implementations of the present invention. The computer apparatus 12 shown in FIG. 14 is only exemplary and shall not form any limitation to the functions and the application scope of the embodiments of the present invention.

As shown in FIG. 14, the computer apparatus 12 shows up as a computing apparatus. The components of the computer apparatus 12 may include, but not limited to, one or more processors or processing units 16, a system memory 28, and a bus 18 for connecting different system components (including the system memory 28 and the processing unit 16). The bus 18, representing one or more of several bus structures, includes a memory bus or memory controller, a peripheral bus, an accelerated graphics port, a processor, or a local bus using any one of the several bus structures. For example, these architectures include, but not limited to, Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer apparatus 12 typically includes a variety of computer system readable media. Such media may be any available media that is accessible by the computer apparatus 12, including both volatile and non-volatile media, removable and non-removable media.

The system memory 28 may include computer system readable media in the form of volatile memory, such as a random access memory (RAM) 30 and/or a cache memory 32. The computer apparatus 12 may further include other removable/non-removable, volatile/non-volatile computer system storage media. By way of example only, a storage system 34 can be provided for reading from and writing to non-removable, non-volatile magnetic media (not shown in FIG. 14, typically called "hard drive"). Although not shown in FIG. 14, a magnetic disk drive for reading from and writing to a removable, non-volatile magnetic disk (e.g., a "floppy disk"), and an optical disk drive for reading from or writing to a removable, non-volatile optical disk (e.g., a CD-ROM, DVD-ROM or other optical media) can be provided. In such instances, each can be connected to the bus 18 by one or more data media interfaces. The memory 28 may include at least one program product having a set (e.g., at least one) of program modules that are configured to carry out the functions of embodiments of the present invention.

A program/utility 40, having a set (at least one) of program modules 42, may be stored in the memory 28. Such program modules 42 include, but not limited to, an operating system, one or more application programs, other program modules, and program data. Each of the operating system, one or more application programs, other program modules, and program data or some combination thereof, may include an implementation of a networking environment. The program modules 42 generally carry out the functions and/or methods of embodiments of the present invention as described herein.

The computer apparatus 12 may also communicate with one or more external apparatuses 14 (e.g., a keyboard, a pointing device, a display 24, etc.); one or more apparatuses that enable a user to interact with the computer apparatus 12; and/or any apparatuses (e.g., network card, modem, etc.) that enable the computer apparatus 12 to communicate with one or more other computing apparatuses. Such communication can occur via Input/Output (I/O) interfaces 22. Still yet, the computer apparatus 12 can communicate with one or more networks (e.g., a local area network (LAN), a general wide area network (WAN), and/or a public network (e.g., the Internet)) through a network adapter 20. As depicted, the network adapter 20 communicates with the other components of the computer apparatus 12 through the bus 18. It should be understood that, although not shown in FIG. 14, other hardware and/or software components could be used in conjunction with the computer apparatus 12, including, but not limited to, microcode, device drivers, redundant processing units, external disk drive arrays, RAID systems, tape drives, and data archival storage systems, etc.

The processing unit 16 executes, by running the programs stored in the system memory 28, various functional applications and data processing.

For example, in one embodiment of the present invention, the processing unit 16 executes, by running the programs stored in the system memory 28, various functional applications and data processing to implement the method for generating a questioning and answering system provided in the embodiment of the present invention.

That is, when performing the program, the processing unit implements: acquiring one or more graphical questioning and answering flowcharts;

generating a standardized code framework matched with the questioning and answering flowchart according to each of graphic components included in each of the questioning and answering flowcharts, where the graphic component includes at least one transaction node, and the transaction node is associated with a service interface executing a set type service; and according to custom configuration information matched with each of the graphic components in the questioning and answering flowchart, generating custom codes corresponding to each of the graphic components respectively and adding the custom codes at a position associated with the graphic component in the standardized code framework, to generate a questioning and answering flow module corresponding to the questioning and answering flowchart, where the custom configuration information matched with the transaction node includes a service invocation address corresponding to the transaction node, and the service invocation address points to a service interface associated with the transaction node;

when the target transaction node in the questioning and answering flow module is triggered, constructing, by the target transaction node, target transaction information according to at least one target dynamic variable input to the target transaction node, sending, by the target transaction node, the target transaction information to a corresponding target service invocation address, and returning a transaction processing result fed back by the service invocation address to the questioning and answering flow module, so that the questioning and answering flow module performs further execution according to the transaction processing result; and adding a thematic knowledge point corresponding to each of the questioning and answering flow modules in the knowledge base, where the thematic knowledge point includes a thematic question and a thematic answer, the thematic question is used to indicate a trigger condition of the questioning and answering flow module, and the thematic answer is used to establish a trigger relationship between the thematic knowledge point and the questioning and answering flow module.

In another embodiment of the present invention, the processing unit 16 performs various function applications and data processing by running a program stored in the system memory 28 to implement the questioning and answering method provided by the embodiment of the present invention.

That is, when executing the program, the processing unit 16 implements: acquiring initial request information input by a user, and matching a knowledge point in a knowledge base with the initial request information, where a plurality of knowledge points are stored in the knowledge base, and each of the knowledge points includes a question and an answer;

if it is determined that the initial request information input by the user is matched with a thematic question of a target thematic knowledge point, triggering a root node of a target questioning and answering flow module corresponding to the target thematic knowledge point according to a thematic answer in the target thematic knowledge point, where the target questioning and answering flow module includes at least one transaction node; and when the target transaction node in the questioning and answering flow module is successfully triggered, constructing, by the target transaction node, target transaction information according to at least one target dynamic variable input to the target transaction node, sending, by the target transaction node, the target transaction information to a corresponding target service invocation address, and returning a target transaction processing result fed back by the target service invocation address to the target questioning and answering flow module, so that the target questioning and answering flow module performs further execution according to the target transaction processing result.

In another embodiment of the present invention, the processing unit 16 performs various function applications and data processing by running a program stored in the system memory 28 to implement a method for modifying a questioning and answering system provided by the embodiment of the present invention.

That is, when performing the program, the processing unit implements: acquiring modification information for a set system component in the questioning and answering system, where the modification information includes any one or any combination of: modifying a thematic knowledge point corresponding to the target questioning and answering system, and modifying a target questioning and answering flow module corresponding to the target questioning and answering system; and correspondingly updating the target questioning and answering system according to the modification information.

An embodiment of the present invention provides a computer storage medium on which a computer program is stored, and when executed by a processor, the program implements various function applications and data processing.

For example, in an embodiment of the present invention, when executed by the processor, the program implements a method for generating a questioning and answering system provided in all embodiments of the present invention, that is, when executed by the processor, the program implements: generating a standardized code framework matched with the questioning and answering flowchart according to each of graphic components included in each of the questioning and answering flowcharts, where the graphic component includes at least one transaction node, and the transaction node is associated with a service interface executing a set type service; and according to custom configuration information matched with each of the graphic components in the questioning and answering flowchart, generating custom codes corresponding to each of the graphic components respectively and adding the custom codes at a position associated with the graphic component in the standardized code framework, to generate a questioning and answering flow module corresponding to the questioning and answering flowchart, where the custom configuration information matched with the transaction node includes a service invocation address corresponding to the transaction node, and the service invocation address points to a service interface associated with the transaction node;

when the target transaction node in the questioning and answering flow module is triggered, constructing, by the target transaction node, target transaction information according to at least one target dynamic variable input to the target transaction node, sending, by the target transaction node, the target transaction information to a corresponding target service invocation address, and returning a transaction processing result fed back by the service invocation address to the questioning and answering flow module, so that the questioning and answering flow module performs further execution according to the transaction processing result; and adding a thematic knowledge point corresponding to each of the questioning and answering flow modules in the knowledge base, where the thematic knowledge point includes a thematic question and a thematic answer, the thematic question is used to indicate a trigger condition of the questioning and answering flow module, and the thematic answer is used to establish a trigger relationship between the thematic knowledge point and the questioning and answering flow module.

In another embodiment of the present invention, when executed by the processor, the program implements a questioning and answering method based on a questioning and answering system and provided in all embodiments of the present invention.

That is, when executed by the processor, the program implements: acquiring initial request information input by a user, and matching a knowledge point in a knowledge base with the initial request information, where a plurality of knowledge points are stored in the knowledge base, and each of the knowledge points includes a question and an answer;

if it is determined that the initial request information input by the user matches a thematic question of a target thematic knowledge point, triggering a root node of a target questioning and answering flow module corresponding to the target thematic knowledge point according to a thematic answer in the target thematic knowledge point, where the target questioning and answering flow module includes at least one transaction node; and when the target transaction node in the questioning and answering flow module is triggered, constructing, by the target transaction node, target transaction information according to at least one target dynamic variable input to the target transaction node, sending, by the target transaction node, the target transaction information to a corresponding target service invocation address, and returning a target transaction processing result fed back by the target service invocation address to the target questioning and answering flow module, so that the target questioning and answering flow module performs further execution according to the target transaction processing result.

In another embodiment of the present invention, when executed by the processor, the program implements a method for modifying a questioning and answering system provided in all embodiments of the present invention.

That is, when executed by the processor, the program implements: acquiring modification information for a set system component in the questioning and answering system, where the modification information includes any one or any combination of: modifying a thematic knowledge point corresponding to the target questioning and answering system, and modifying a target questioning and answering flow module corresponding to the target questioning and answering system; and correspondingly updating the target questioning and answering system according to the modification information.

Any combination of one or more computer readable media can be utilized. The computer readable medium may be a computer readable signal medium or a computer readable storage medium. The computer readable storage medium may be, for example, but not limited to, an electronic, magnetic, optical, electromagnetic, infrared, or semiconductor system, device or means, or any combination of the above. More specific examples (a non-exhaustive list) of the computer readable storage medium include: an electrical connection having one or more wires, a portable computer disk, a hard disk, a random access memory (RAM), a read only memory (ROM), an erasable programmable read only memory (EPROM or a flash memory), an optical fiber, a portable compact disk read only memory (CD-ROM), an optical storage means, a magnetic storage means, or any suitable combination of the above. In this document, a computer readable storage medium may be any tangible medium that includes or stores a program, and the program may be used by or in connection with an instruction execution system, device or means.

A computer readable signal medium may include a propagated data signal with computer readable program code embodied therein in baseband or as part of a carrier wave. Such a propagated data signal may use a variety of forms including, but not limited to, an electromagnetic signal, an optical signal, or any suitable combination of the above. The computer readable signal medium may further be any computer readable medium other than a computer readable storage medium, which may transmit, propagate, or transport a program used by or in connection with an instruction execution system, device or means.

Program code embodied on a computer readable medium may be transmitted by any suitable medium, including but not limited to wireless, wire, optical cable, RF, or the like, or any suitable combination of the above.

Computer program code for carrying out operations of the present invention may be written in one or more programming languages, or combinations thereof, including an object oriented programming language such as Java, Smalltalk, C++, and conventional procedural programming language, such as the "C" language or a similar programming language. The program code may be executed entirely on a user's computer, partly on a user's computer, as a stand-alone software package, partly on a user's computer while partly on a remote computer, or entirely on a remote computer or server. In the case of a remote computer, the remote computer may be connected to a user's computer through any type of networks, including a local area network (LAN) or a wide area network (WAN), or the connection may be made to an external computer (for example, through the Internet using an Internet Service Provider).

It should be noted that the above are only the preferred embodiments of the present invention and the technical principles applied thereto. Those skilled in the art will appreciate that the present invention is not limited to the specific embodiments described herein, and various modifications, changes and substitutions can be made by those skilled in the art without departing from the scope of the invention. Therefore, the present invention is described in detail by the above embodiments, but the present invention is not limited to the above embodiments, and other equivalent embodiments may also be included without departing from the inventive concept. The scope of the present invention should be defined by the appended claims.

What is claimed is:

1. A questioning and answering method, applied to a questioning and answering system and executed by one or more processors when one or more computer-readable instructions stored in a memory are read by the one or more processors, comprising:
   acquiring initial request information input by a user, and matching a knowledge point in a knowledge base with the initial request information, wherein a plurality of knowledge points are stored in the knowledge base, and each of the knowledge points comprises a question and an answer;
   if the initial request information input by the user matches a thematic question of a target thematic knowledge point, triggering a root node of a target questioning and answering flow module corresponding to the target thematic knowledge point according to a thematic answer in the target thematic knowledge point, wherein the target questioning and answering flow module comprises at least one transaction node, and each of the at least one transaction node is associated with a service interface executing a set type service; and
   when a target transaction node in the target questioning and answering flow module is successfully triggered, constructing, by the target transaction node, target transaction information according to at least one target dynamic variable input to the target transaction node, sending, by the target transaction node, the target transaction information to a corresponding target service invocation address through the service interface, and returning a target transaction processing result fed back by the target service invocation address to the target questioning and answering flow module, so that the target questioning and answering flow module performs to a next target transaction node according to the target transaction processing result.

2. The method according to claim 1, wherein the questioning and answering system comprises:
   a questioning and answering flow module corresponding to a questioning and answering flowchart, wherein the questioning and answering flowchart comprises a plurality of graphic components, and the graphic components comprise at least one transaction node, wherein the transaction node is associated with a service interface executing a set type service; and
   a thematic knowledge point stored in the knowledge base, wherein the thematic knowledge point comprises a thematic question and a thematic answer, the thematic question is used to indicate a trigger condition of the questioning and answering flow module matched with the questioning and answering system, and the thematic answer is used to establish a trigger relationship between the thematic knowledge point and the questioning and answering flow module.

3. The method according to claim 2, wherein the questioning and answering system further comprises:
   a knowledge point corresponding to a set transaction node in the questioning and answering flow module and stored in the knowledge base,
   wherein the knowledge point corresponding to the transaction node comprises a transaction question and a transaction answer, and the transaction answer comprises an associated transaction node, a type of at least one incoming parameter, a type of at least one missing parameter, and counter-question content matched with the type of the missing parameter;
   the transaction question is used to match received user input information;
   the type of the incoming parameter is used to match a type of a dynamic variable comprised in the user input information; the type of the missing parameter and the counter-question content matched with the type of the missing parameter are used to determine counter-question content corresponding to the type of the missing parameter in the user input information; and the associated transaction node is used to determine an incoming transaction node from the dynamic variable comprised in the user input information.

4. The method according to claim 2, wherein the questioning and answering flow module corresponding to the questioning and answering flowchart comprises:
   a standardized code framework matched with the questioning and answering flowchart and generated according to each of the graphic components comprised in the questioning and answering flowchart; and
   a custom code added at a position associated with a graphic component in the standardized code framework and corresponding to each of the graphic components respectfully, and generated according to custom configuration information matched with each of the graphic components in the questioning and answering flowchart, wherein the custom configuration information matched with the transaction node comprises a service invocation address corresponding to the transaction node, and the service invocation address points to a service interface associated with the transaction node.

5. The method according to claim 2, wherein the target transaction node corresponds to a first knowledge point in the knowledge base, and the target knowledge point comprises a target transaction question and a target transaction answer;

the target transaction node in the questioning and answering flow module being successfully triggered comprises:

matching user input information acquired for the target transaction node with the target transaction question in the target knowledge point;

if the matching is successful, extracting at least one target dynamic variable from the user input information;

if a number of types of the extracted target dynamic variables is less than a number of types of incoming parameters in the target transaction answer, determining a type of at least one target missing parameter;

feeding back counter-question content corresponding to the type of the target missing parameter in the target transaction answer, and requesting re-inputting a target dynamic variable corresponding to the type of the target missing parameter;

re-extracting the at least one target dynamic variable from re-input user input information, and, if a number of types of the extracted target dynamic variables is less than a number of types of incoming parameters in the target transaction answer, determining operation of a type of at least one target missing parameter, until target dynamic variables corresponding to types of all incoming parameters in the target transaction answer are completely extracted; and determining that the target transaction node is successfully triggered and inputting all of the extracted target dynamic variables to the target transaction node.

6. The method according to claim 2, wherein the constructing, by the target transaction node, target transaction information according to at least one target dynamic variable input to the target transaction node, and sending, by the target transaction node, the target transaction information to a corresponding target service invocation address comprise:

constructing, by the target transaction node, target transaction information according to at least one target dynamic variable input to the target transaction node and an incoming parameter definition item corresponding to the target transaction node, and sending, by the target transaction node, the target transaction information to the target service invocation address matched with the target transaction node, wherein the incoming parameter definition item comprises at least one incoming parameter name and an incoming parameter variable matched with the incoming parameter name, the incoming parameter name is a parameter name capable of being recognized by a service interface associated with the target transaction node, and the incoming parameter variable matches the target dynamic variable input to the target transaction node.

7. The method according to claim 2, wherein the returning a target transaction processing result fed back by the target service invocation address to the target questioning and answering flow module, so that the target questioning and answering flow module performs further execution according to the target transaction processing result comprises:

if the target transaction node is associated with at least two downstream connectors, determining a target downstream connector matched with the target transaction processing result according to the target transaction processing result and target dynamic condition configuration information of each of the downstream connectors; and controlling the target questioning and answering flow module to proceed to a target downstream node connected to the target downstream connector to perform further execution, wherein the target dynamic condition configuration information comprises an outputting parameter definition item and a condition set value, wherein the outputting parameter definition item matches at least one target transaction processing result received by the target transaction node, and the condition set value is used for conditional comparison with the target transaction processing result in the outputting parameter definition item.

8. The method according to claim 7, wherein the controlling the target questioning and answering flow module to proceed to a target downstream node connected to the target downstream connector to perform further execution comprises:

broadcasting, according to broadcast content matched with a target transaction processing structure and set by the target downstream node, to the user, wherein the broadcast content comprises the target transaction processing result, a combination of the target transaction processing result and preset information, or a combination of the target transaction processing result and a target dynamic variable input to the target transaction node, and the target downstream node comprises an interaction node, a broadcast node, or another transaction node.

9. The method according to claim 1, wherein the questioning and answering system is generated by following steps:

acquiring one or more graphical questioning and answering flowcharts;

generating a standardized code framework matched with the questioning and answering flowchart according to each of graphic components comprised in each of the questioning and answering flowcharts, wherein the graphic component comprises at least one transaction node, and the transaction node is associated with a service interface executing a set type service;

according to custom configuration information matched with each of the graphic components in the questioning and answering flowchart, generating custom codes corresponding to each of the graphic components respectfully and adding the custom codes at a position associated with the graphic component in the standardized code framework, to generate a questioning and answering flow module corresponding to the questioning and answering flowchart, wherein the custom configuration information matched with the transaction node comprises a service invocation address corresponding to the transaction node, and the service invocation address points to a service interface associated with the transaction node;

when the target transaction node in the questioning and answering flow module is triggered, constructing, by the target transaction node, transaction information according to at least one dynamic variable input to the target transaction node, sending, by the target transaction node, the transaction information to the corresponding service invocation address, and returning a transaction processing result fed back by the service invocation address to the questioning and answering flow module, so that the questioning and answering flow module performs further execution according to the transaction processing result; and adding a thematic knowledge point corresponding to each of the questioning and answering flow modules in the knowledge base, wherein the thematic knowledge point comprises a thematic question and a thematic answer, the thematic question is used to indicate a trigger condition of the questioning and answering flow module, and the thematic answer is used to establish a trigger relationship between the thematic knowledge point and the questioning and answering flow module.

10. The method according to claim 9, further comprising:

enabling a set transaction node to correspond to one knowledge point in the knowledge base, wherein the knowledge point corresponding to the transaction node comprises a transaction question and a transaction answer, the transaction answer comprises an associated transaction node, a type of at least one incoming parameter, a type of at least one missing parameter, and counter-question content matched with the type of the missing parameter, the transaction question is used to match received user input information;

the type of the incoming parameter is used to match a type of a dynamic variable comprised in the user input information; the type of the missing parameter and the counter-question content matched with the type of the missing parameter are used to determine counter-question content corresponding to the type of the missing parameter in the user input information; and the associated transaction node is used to determine an incoming transaction node from the dynamic variable comprised in the user input information.

11. The method according to claim 9, wherein the custom configuration information further comprises: an incoming parameter definition item corresponding to a first transaction node, wherein the incoming parameter definition item comprises at least one incoming parameter name and an incoming parameter variable matched with the incoming parameter name, the incoming parameter name is a parameter name capable of being recognized by a service interface associated with the first transaction node, the incoming parameter name is a parameter name capable of being recognized by a service interface associated with the first transaction node, and the incoming parameter variable matches the dynamic variable input into the first transaction node; and the transaction information comprises the incoming parameter name and the incoming parameter variable.

12. The method according to claim 9, wherein the graphics component further comprises a connector for connecting different nodes.

13. The method according to claim 12, wherein the custom configuration information comprises:

dynamic condition configuration information matched with a first connector, wherein the first connector is used to connect an associated upper node and an associated lower node, and the associated upper node is a second transaction node, and the dynamic condition configuration information is a condition that the questioning and answering flow module is proceeded from the associated upper node to the associated lower node, wherein the dynamic condition configuration information comprises an outputting parameter definition item and a condition set value, wherein the outputting parameter definition item corresponds to at least one transaction processing result received by the transaction node, and the condition set value is used for conditional comparison with the transaction processing result in the outputting parameter definition item.

14. The method according to claim 9, wherein the graphics component further comprises an interaction node, and the method further comprises: establishing a correspondence between each of the interaction nodes and one or more knowledge points in the knowledge base, and the knowledge points corresponding to the interaction node comprises: an interaction problem and an interaction answer, wherein the interaction problem is used to match received user interaction information, and the interaction answer is used to determine a next proceeding trend of the questioning and answering flow module.

15. The method according to claim 14, wherein the graphics component further comprises a broadcast node.

16. The method according to claim 15, wherein the custom configuration information further comprises broadcast content corresponding to a first node;

the first node is connected to a third transaction node through a connector, and the first node is located downstream of the third transaction node and comprises an interaction node, a broadcast node or another transaction node; and the broadcast content comprises the transaction processing result received by the third transaction node, a combination of the transaction processing result received by the third transaction node and preset information, or a combination of the transaction processing result received by the third transaction node and a dynamic variable input to the third transaction node.

17. The method according to claim 1, wherein the questioning and answering system is modified by following steps:

acquiring modification information for a set system component in the questioning and answering system, wherein the modification information comprises any one or any combination of: modifying a thematic knowledge point corresponding to the questioning and answering system, and modifying a target questioning and answering flow module corresponding to the questioning and answering system; and correspondingly updating the questioning and answering system according to the modification information.

18. The method according to claim 17, wherein the modifying a target questioning and answering flow module corresponding to the questioning and answering system comprises: adding, deleting, and/or adjusting a transaction node of the target questioning and answering flow module;

the correspondingly updating the questioning and answering system according to the modification information comprises: according to an addition location of at least one added transaction node in a questioning and answering flowchart corresponding to the questioning and answering system and custom configuration information matched with the added transaction node, correspondingly updating a questioning and answering flow module corresponding to the questioning and answering system, and establishing a correspondence between the added transaction node and one knowledge point in the knowledge base;

according to a deletion position of at least one deleted transaction node in the questioning and answering flowchart corresponding to the questioning and answering system, correspondingly updating the questioning and answering flow module corresponding to the questioning and answering system, and deleting a correspondence between the deleted transaction node and one knowledge point in the knowledge base; and according to an original position and an adjusted position of at least one adjusted transaction node in the questioning and answering flowchart corresponding to the questioning and answering system, correspondingly updating the questioning and answering flow module corresponding to the questioning and answering system.

19. The method according to claim 18, wherein the deleting a correspondence between the deleted transaction node and one knowledge point in the knowledge base comprises:

searching, in the knowledge base, one knowledge point corresponding to the delete node as a to-be-deleted knowledge point;

if the to-be-deleted knowledge point only corresponds to the deleted transaction node, deleting the to-be-deleted knowledge point in the knowledge base, and deleting a correspondence between the deleted transaction node and the to-be-deleted knowledge point; and if the to-be-deleted knowledge point corresponds to another transaction node besides the deleted transaction node, retaining the to-be-deleted knowledge point in the knowledge base, and only deleting the correspondence between the deleted transaction node and the to-be-deleted knowledge point.

20. The method according to claim 17, wherein the modifying a target questioning and answering flow module corresponding to the questioning and answering system comprises: adding, deleting, and/or adjusting a broadcast node and/or a connector of the target questioning and answering flow module; and the correspondingly updating the questioning and answering system according to the modification information comprises:

according to an addition location of at least one added broadcast node and/or added connector in a questioning and answering flowchart corresponding to the questioning and answering system and custom configuration information matched with the added broadcast node and/or added connector, correspondingly updating a questioning and answering flow module corresponding to the questioning and answering system;

according to a deletion position of at least one delete broadcast node and/or delete connector in the questioning and answering flowchart corresponding to the questioning and answering system, correspondingly updating the questioning and answering flow module corresponding to the questioning and answering system, and according to an original position and an adjusted position of at least one adjusted broadcast node and/or adjusted connector in the questioning and answering flowchart corresponding to the questioning and answering system, correspondingly updating the questioning and answering flow module corresponding to the questioning and answering system.

* * * * *